United States Patent
Miyamoto

(10) Patent No.: US 9,211,475 B2
(45) Date of Patent: Dec. 15, 2015

(54) GAME DEVICE AND STORAGE MEDIUM STORING GAME PROGRAM FOR PERFORMING A GAME PROCESS BASED ON DATA FROM SENSOR

(75) Inventor: Takeshi Miyamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1939 days.

(21) Appl. No.: 11/798,688

(22) Filed: May 16, 2007

(65) Prior Publication Data
US 2008/0242385 A1 Oct. 2, 2008

(30) Foreign Application Priority Data
Mar. 30, 2007 (JP) .................................. 2007-093662

(51) Int. Cl.
| | |
|---|---|
| A63F 13/00 | (2014.01) |
| A63F 13/80 | (2014.01) |
| A63F 13/20 | (2014.01) |
| A63F 13/812 | (2014.01) |
| A63F 13/21 | (2014.01) |

(Continued)

(52) U.S. Cl.
CPC ................. *A63F 13/20* (2014.09); *A63F 13/06* (2013.01); *A63F 13/21* (2014.09); *A63F 13/211* (2014.09); *A63F 13/428* (2014.09); *A63F 13/80* (2014.09); *A63F 13/812* (2014.09); *A63F 13/213* (2014.09); *A63F 13/816* (2014.09); *A63F 2300/105* (2013.01); *A63F 2300/1006* (2013.01); *A63F 2300/1087* (2013.01); *A63F 2300/8005* (2013.01); *A63F 2300/8011* (2013.01)

(58) Field of Classification Search
CPC ..... A63F 13/812; A63F 13/816; A63F 13/80; A63F 13/21; A63F 13/211; A63F 13/213; A63F 13/428; A63F 2300/1087; A63F 2300/105; A63F 2300/1006; A63F 2300/8005; A63F 2300/8011; A63F 13/06; A63F 13/20
USPC ................................................. 463/36, 37, 39
See application file for complete search history.

(56) References Cited

U.S. PATENT DOCUMENTS

| | | | | |
|---|---|---|---|---|
| 6,397,151 | B1 * | 5/2002 | Yamagishi et al. ............. | 702/41 |
| 6,926,608 | B2 * | 8/2005 | Tashiro et al. .................. | 463/31 |

(Continued)

FOREIGN PATENT DOCUMENTS

| | | |
|---|---|---|
| JP | 2001-104636 A | 4/2001 |
| JP | 2003-205172 A | 7/2003 |
| WO | WO 03/095048 A1 | 11/2003 |

OTHER PUBLICATIONS

"Wii Sports instructions manual", Nintendo Co., Ltd., Dec. 2, 2006 (date of sale), pp. 14-15.

*Primary Examiner* — William H McCulloch, Jr.
(74) *Attorney, Agent, or Firm* — Nixon & Vanderhye P.C.

(57) ABSTRACT

Obtaining means obtains acceleration data from an input device. Swing detection means detects a swing of the input device in a real space when an acceleration represented by the acceleration data satisfies a predetermined condition. Type determination means determines a type of swing of the input device in the real space by using an acceleration in a predetermined axial direction among all the accelerations represented by the acceleration data obtained by the obtaining means after the detection by the swing detection means. Object moving means moves a predetermined object in a virtual game space according to the type determined by the type determination means. Display control means displays the virtual game space with the object therein on a display device.

17 Claims, 20 Drawing Sheets

(51) Int. Cl.
*A63F 13/211* (2014.01)
*A63F 13/428* (2014.01)
*A63F 13/816* (2014.01)
*A63F 13/213* (2014.01)

(56) References Cited

U.S. PATENT DOCUMENTS

| | | | | |
|---|---|---|---|---|
| 6,982,697 | B2* | 1/2006 | Wilson et al. | 345/156 |
| 7,158,118 | B2* | 1/2007 | Liberty | 345/158 |
| 7,322,889 | B2* | 1/2008 | Ueshima | 463/34 |
| 7,371,164 | B2* | 5/2008 | Ueshima | 463/8 |
| 7,379,841 | B2* | 5/2008 | Ohta | 702/154 |
| 7,412,348 | B2* | 8/2008 | Okamura | 702/152 |
| 7,414,611 | B2* | 8/2008 | Liberty | 345/158 |
| 7,424,388 | B2* | 9/2008 | Sato | 702/152 |
| 7,426,878 | B2* | 9/2008 | Lian et al. | 73/865.4 |
| 7,445,550 | B2* | 11/2008 | Barney et al. | 463/37 |
| 7,500,917 | B2* | 3/2009 | Barney et al. | 463/37 |
| 7,596,466 | B2* | 9/2009 | Ohta | 702/152 |
| 7,635,301 | B2* | 12/2009 | Ueshima | 463/3 |
| 7,698,092 | B2* | 4/2010 | Sano et al. | 702/141 |
| 7,711,505 | B2* | 5/2010 | Ohta | 702/85 |
| 7,716,008 | B2* | 5/2010 | Ohta | 702/152 |
| 7,774,155 | B2* | 8/2010 | Sato et al. | 702/127 |
| 7,775,882 | B2* | 8/2010 | Kawamura et al. | 463/32 |
| 7,854,656 | B2* | 12/2010 | Sato et al. | 463/36 |
| 7,872,638 | B2* | 1/2011 | Sato | 345/164 |
| 7,877,224 | B2* | 1/2011 | Ohta | 702/152 |
| 7,920,985 | B2* | 4/2011 | Ohta | 702/154 |
| 7,925,467 | B2* | 4/2011 | Ohta | 702/150 |
| 7,932,908 | B1* | 4/2011 | Ueshima et al. | 345/474 |
| 7,938,725 | B2* | 5/2011 | Okamura | 463/37 |
| 7,980,951 | B2* | 7/2011 | Yoshida | 463/36 |
| 7,988,558 | B2* | 8/2011 | Sato | 463/37 |
| 8,157,651 | B2* | 4/2012 | Ohta et al. | 463/37 |
| 8,303,412 | B2* | 11/2012 | Okamura | 463/37 |
| 8,353,769 | B2* | 1/2013 | Okamura | 463/37 |
| 8,419,539 | B2* | 4/2013 | Sato et al. | 463/37 |
| 8,469,814 | B2* | 6/2013 | Shimamura et al. | 463/37 |
| 8,568,232 | B2* | 10/2013 | Miyamoto et al. | 463/37 |
| 8,672,760 | B2* | 3/2014 | Sato | 463/37 |
| 2002/0072418 | A1* | 6/2002 | Masuyama et al. | 463/43 |
| 2004/0029640 | A1* | 2/2004 | Masuyama et al. | 463/43 |
| 2005/0124413 | A1* | 6/2005 | Ueshima | 463/30 |
| 2005/0243062 | A1* | 11/2005 | Liberty | 345/158 |
| 2006/0028446 | A1* | 2/2006 | Liberty et al. | 345/158 |
| 2007/0050597 | A1* | 3/2007 | Ikeda | 712/1 |
| 2007/0060228 | A1* | 3/2007 | Akasaka et al. | 463/1 |
| 2007/0060383 | A1* | 3/2007 | Dohta | 463/43 |
| 2007/0060384 | A1* | 3/2007 | Dohta | 463/43 |
| 2007/0060385 | A1* | 3/2007 | Dohta | 463/43 |
| 2007/0072674 | A1* | 3/2007 | Ohta et al. | 463/37 |
| 2007/0191112 | A1* | 8/2007 | Ohta | 463/43 |
| 2007/0197290 | A1* | 8/2007 | Ueshima | 463/36 |
| 2007/0207856 | A1* | 9/2007 | Sato | 463/32 |
| 2007/0213109 | A1* | 9/2007 | Sato et al. | 463/3 |
| 2007/0213127 | A1* | 9/2007 | Sato | 463/36 |
| 2007/0233424 | A1* | 10/2007 | Ohta | 702/154 |
| 2007/0243931 | A1* | 10/2007 | Ohta et al. | 463/37 |
| 2007/0254738 | A1* | 11/2007 | Sato | 463/31 |
| 2007/0257884 | A1* | 11/2007 | Taira et al. | 345/158 |
| 2007/0265072 | A1* | 11/2007 | Matsuda et al. | 463/35 |
| 2007/0265075 | A1* | 11/2007 | Zalewski | 463/36 |
| 2007/0265084 | A1* | 11/2007 | Sato et al. | 463/37 |
| 2007/0265085 | A1* | 11/2007 | Miyamoto et al. | 463/37 |
| 2007/0265086 | A1* | 11/2007 | Aoyagi et al. | 463/37 |
| 2007/0270218 | A1* | 11/2007 | Yoshida et al. | 463/37 |
| 2007/0270219 | A1* | 11/2007 | Sugioka et al. | 463/37 |
| 2007/0270220 | A1* | 11/2007 | Kaneshige et al. | 463/37 |
| 2008/0014835 | A1* | 1/2008 | Weston et al. | 446/484 |
| 2008/0015031 | A1* | 1/2008 | Koizumi et al. | 463/43 |
| 2008/0064109 | A1* | 3/2008 | Okamura | 436/36 |
| 2008/0076565 | A1* | 3/2008 | Okamura | 463/37 |
| 2008/0076566 | A1* | 3/2008 | Miyamoto | 463/37 |
| 2008/0119269 | A1* | 5/2008 | Nonaka et al. | 463/32 |
| 2008/0132335 | A1* | 6/2008 | Yamaguchi | 463/37 |
| 2008/0132338 | A1* | 6/2008 | Yoshida | 463/43 |
| 2008/0177497 | A1* | 7/2008 | Ohta | 702/141 |
| 2008/0204406 | A1* | 8/2008 | Ueno | 345/156 |
| 2008/0215288 | A1* | 9/2008 | Ohta | 702/154 |
| 2008/0242385 | A1* | 10/2008 | Miyamoto | 463/1 |
| 2008/0275667 | A1* | 11/2008 | Ohta | 702/154 |
| 2008/0280660 | A1* | 11/2008 | Ueshima et al. | 463/3 |
| 2009/0322679 | A1* | 12/2009 | Sato et al. | 345/158 |
| 2009/0325703 | A1* | 12/2009 | Suzuki et al. | 463/37 |
| 2009/0326846 | A1* | 12/2009 | Ohta | 702/85 |
| 2009/0326847 | A1* | 12/2009 | Ohta | 702/93 |
| 2010/0009751 | A1* | 1/2010 | Shimamura et al. | 463/36 |
| 2010/0144447 | A1* | 6/2010 | Nonaka et al. | 463/43 |
| 2010/0178988 | A1* | 7/2010 | Izuno et al. | 463/43 |
| 2010/0203969 | A1* | 8/2010 | Takahashi et al. | 463/32 |
| 2010/0248833 | A1* | 9/2010 | Okamura | 463/36 |
| 2010/0267443 | A1* | 10/2010 | Shimamura et al. | 463/23 |
| 2010/0323783 | A1* | 12/2010 | Nonaka et al. | 463/23 |
| 2010/0323795 | A1* | 12/2010 | Yamashita et al. | 463/36 |
| 2011/0086710 | A1* | 4/2011 | Sato | 463/37 |
| 2011/0172017 | A1* | 7/2011 | Takahashi et al. | 463/39 |
| 2013/0059658 | A1* | 3/2013 | Shimamura et al. | 463/36 |
| 2013/0059659 | A1* | 3/2013 | Shimamura et al. | 463/36 |

* cited by examiner

F I G. 2
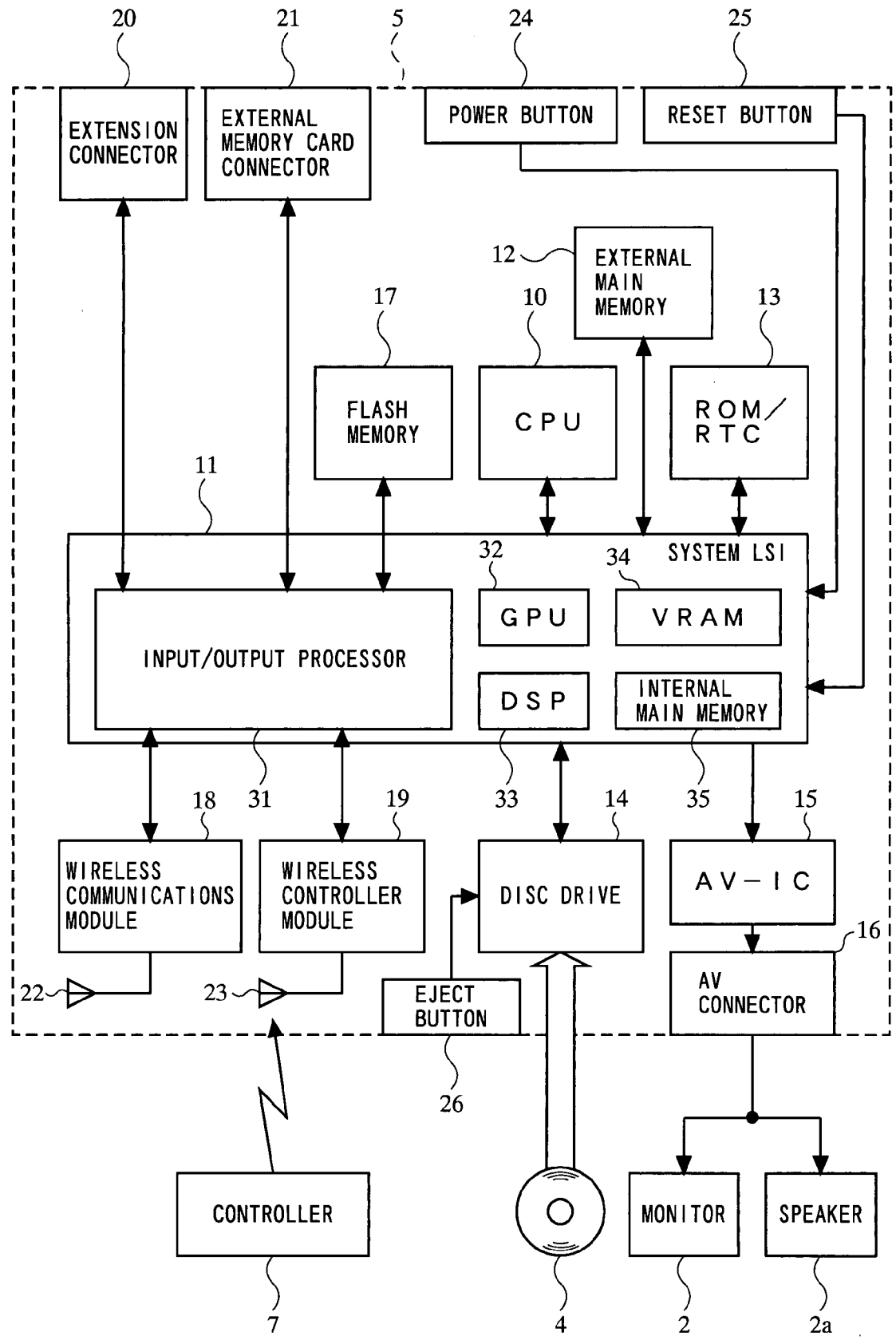

F I G. 7
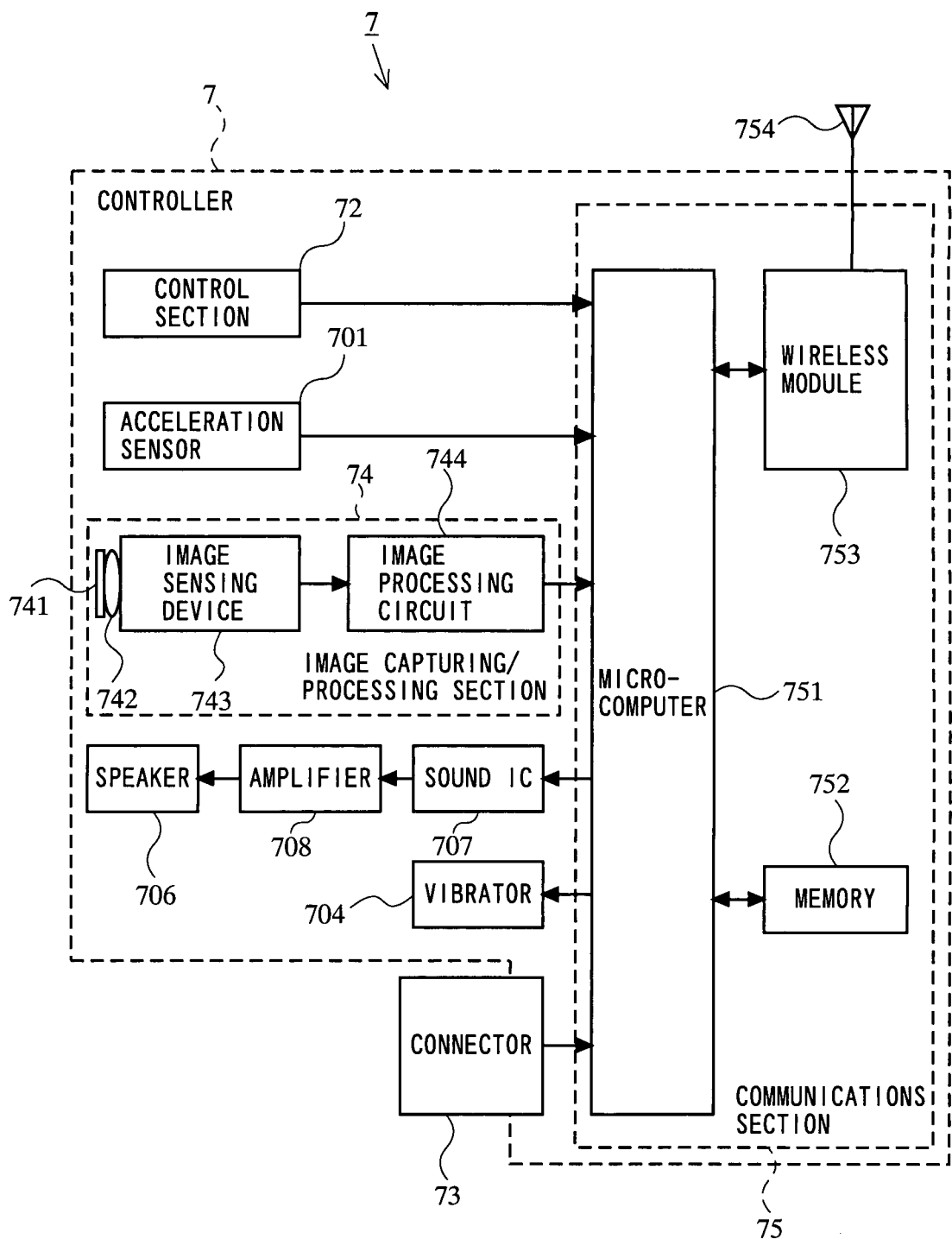

F I G. 8
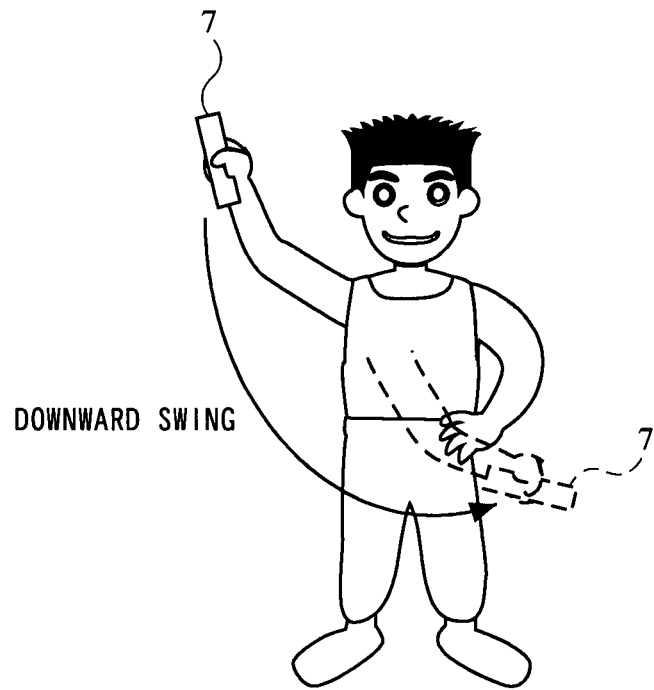
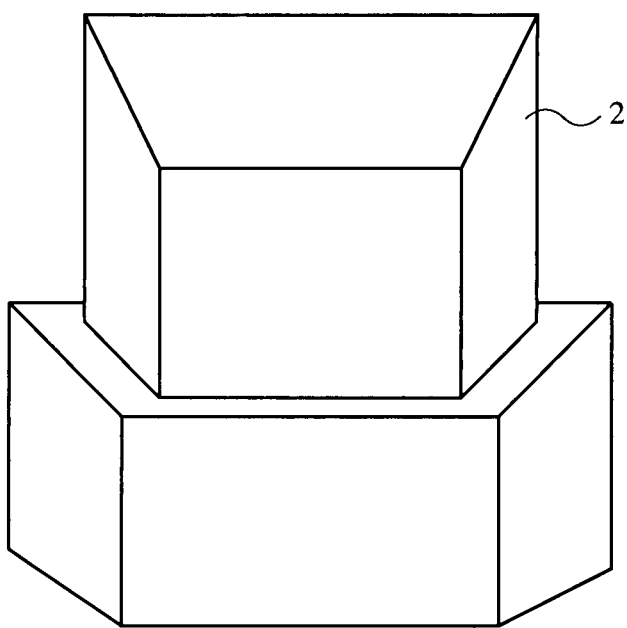

F I G. 9
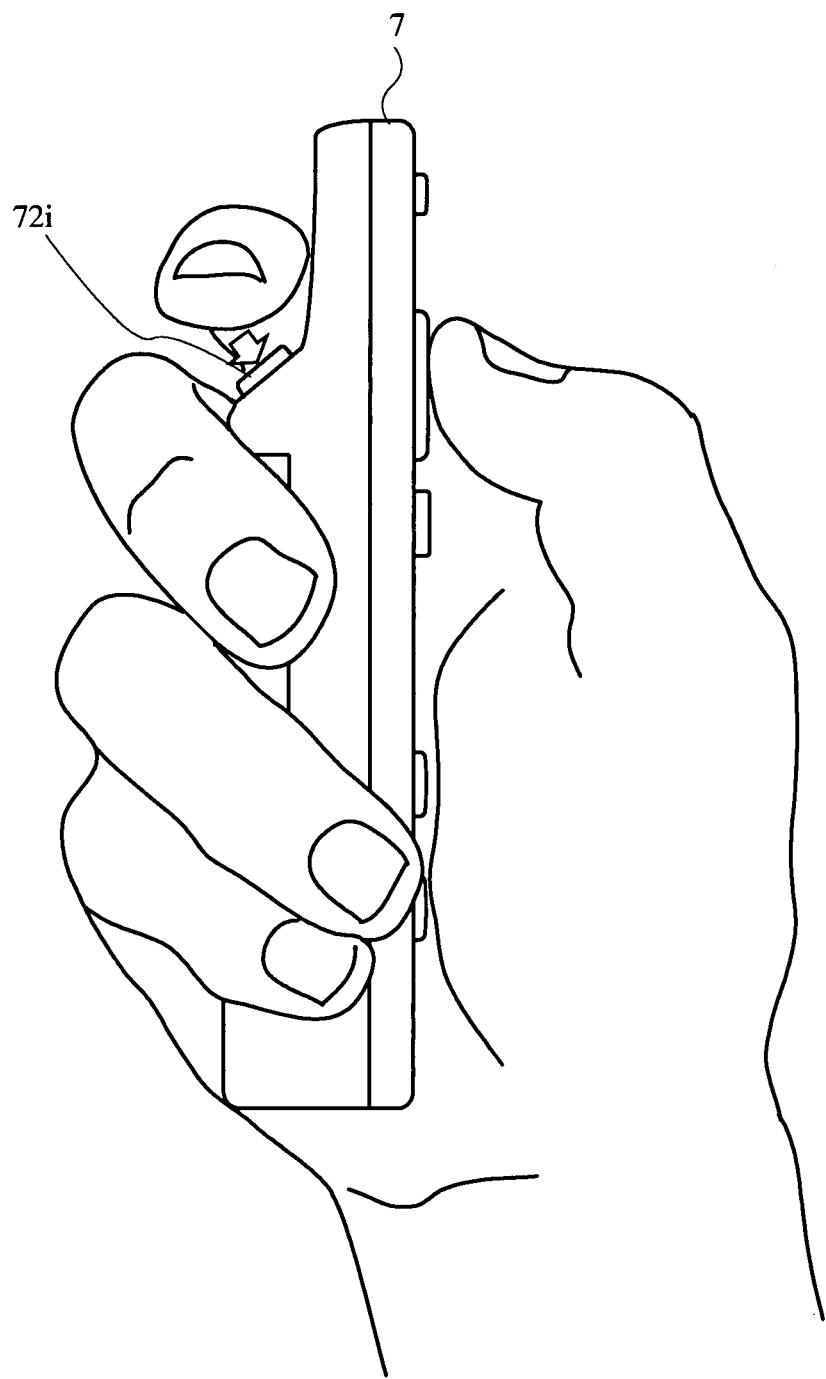

F I G. 1 4
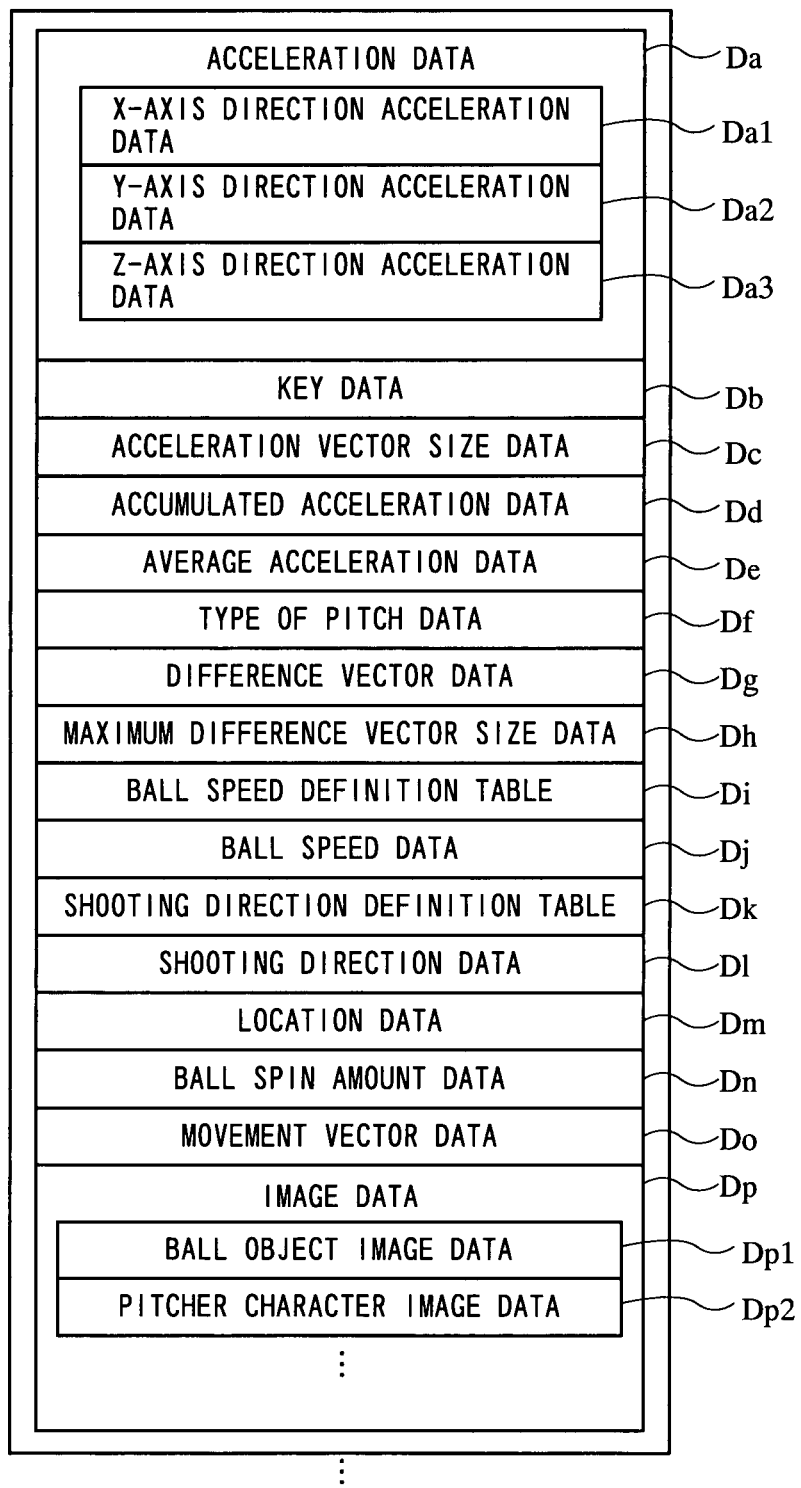

F I G. 1 8

BALL SPEED DEFINITION TABLE

| MAGNITUDE Lmax | BALL SPEED LEVEL |
|---|---|
| 0.0~2.3 | 0 |
| 2.3~3.0 | 1 |
| 3.0~3.7 | 2 |
| 3.7~4.0 | 3 |
| 4.0~ | 4 |

F I G. 1 9

SHOOTING DIRECTION DEFINITION TABLE

| LOCATION | TYPE OF PITCH | | |
|---|---|---|---|
| | FASTBALL | CURVEBALL | SCREWBALL |
| INSIDE | Dfi | Dbi | Dsi |
| MIDDLE | Dfc | Dbc | Dsc |
| OUTSIDE | Dfo | Dbo | Dso |

GAME DEVICE AND STORAGE MEDIUM STORING GAME PROGRAM FOR PERFORMING A GAME PROCESS BASED ON DATA FROM SENSOR

CROSS REFERENCE TO RELATED APPLICATION

The disclosure of Japanese Patent Application No. 2007-93662, filed on Mar. 30, 2007, is incorporated herein by reference.

BACKGROUND AND SUMMARY

The technology presented herein relates to a game device and a storage medium storing a game program, and more particularly to a game device and a storage medium storing a game program, in which a game process is performed according to data outputted from an acceleration sensor.

There are various types of conventional game devices capable of displaying, on a display device, a baseball game performed in a virtual game world. For example, "Wii Sports instructions manual", Nintendo Co., Ltd., Dec. 2, 2006 (date of sale), pp. 14-15 (hereinafter referred to as "Non-Patent Document 1") describes a baseball game in which a game operation is performed by swinging a game controller being held in the hand of the player. In the baseball game described in Non-Patent Document 1, the player swings down the game controller as if the player would throw the ball to thereby activate a pitching operation in the baseball game (the pitcher pitches the ball in the game). A breaking ball can be thrown in the baseball game if the player swings down the game controller while holding down the A button or the B button of the game controller.

When a pitcher throws a breaking ball in a real baseball game, the pitcher typically gives a twist to the ball. However, when throwing a breaking ball in the game device described in Non-Patent Document 1, the player selects the type of pitch by a button operation but not by giving a twist to the game controller being held by the player. This introduces an unnatural element to the game. Moreover, the player needs to remember which button to press for each type of pitch, thus making the operation more complicated than real pitching.

Therefore, a feature of an example embodiment presented herein is to provide a game device and a storage medium storing a game program, which realize a more intuitive and simpler operation input by using data outputted from an acceleration sensor.

The present embodiment has the following features to attain the above. Note that parenthetic expressions in the following section (reference numerals, step numbers, etc.) are merely to indicate the correlation between what is described in the following section and what is described in the description of the preferred embodiments set out further below in the present specification, and are in no way intended to restrict the scope of the present embodiment.

A first aspect of the present embodiment is directed to a game device (5) for performing a game process by using acceleration data (Da) outputted from a multi-axis acceleration sensor (an acceleration sensor 701 detecting accelerations in the X-, Y- and Z-axis directions) provided in an input device (7). The game device includes obtaining means (a CPU 10 performing steps 54, 58 and 87; hereinafter only the step numbers will be shown), swing detection means (S55, S56), type determination means (S59, S81, S82 to S86), object moving means (S84 to S86, S90), and display control means (S90). The obtaining means obtains the acceleration data from the input device. The swing detection means detects a swing of the input device in a real space when an acceleration represented by the acceleration data satisfies a predetermined condition (s>2.5). The type determination means determines a type of swing (swing type) of the input device in the real space by using an acceleration in a predetermined axial direction (the Y-axis direction) of the multi-axis acceleration sensor among all the accelerations represented by the acceleration data obtained by the obtaining means after the detection by the swing detection means. The object moving means moves a predetermined object (OBJ) in a virtual game space according to the type determined by the type determination means. The display control means displays the virtual game space with the object therein on a display device (2).

In a second aspect, wherein the type determination means determines the type based on the acceleration in the predetermined axial direction represented by the acceleration data, which is obtained by the obtaining means during a predetermined period of time (N=10) after the detection by the swing detection means.

In a third aspect, wherein the type determination means selects one type from among a plurality of types (FIGS. 10 to 12) pre-defined based on a twist given to the input device assembly when the input device is swung in the real space, based on the acceleration in the predetermined axial direction.

In a fourth aspect, wherein the type determination means selects one type from among the plurality of types based on a comparison between a predetermined threshold value (the first determination value, the second determination value) and the acceleration in the predetermined axial direction (S82, S83).

In a fifth aspect, wherein the type determination means determines, in advance, a first threshold value (1.0) to be greater than a reference value (accY=0) and a second threshold value (−1.6) to be smaller than the reference value so that a difference between the first threshold value and the reference value is different from a difference between the second threshold value and the reference value, wherein the reference value is a value of the acceleration in the predetermined axial direction occurring when the input device is swung with no twist being given to the input device assembly. The type determination means selects one of the plurality of types based on a comparison between the first and second threshold values and the acceleration in the predetermined axial direction.

In a sixth aspect, wherein the predetermined axial direction is a direction perpendicular to a direction of an axis (the Z axis) about which the input device assembly is twisted.

In a seventh aspect, wherein the object moving means includes change-of-direction type selecting means (S84 to S86). The change-of-direction type selecting means selects one of a plurality of change-of-direction types (the types of pitch: fastball, curveball, screwball) based on the type determined by the type determination means, each change-of-direction type representing a direction in which a movement direction of the object changes in the virtual game space. The object moving means moves the object in the virtual game space according to the change-of-direction type selected by the change-of-direction type selecting means.

In an eighth aspect, wherein the game device further includes acceleration history storage means (S54, S58, S87) and moving speed determination means (S101 to S103). The acceleration history storage means stores a history of acceleration data obtained by the obtaining means over a predetermined period of time (N=15). The moving speed determination means determines a moving speed (the ball speed) of the object in the virtual game space based on changes in an acceleration in the predetermined axial direction (the Y-axis direction) and that in an axial direction (the X-axis direction) other than the predetermined axial direction among all the accelerations represented by the history of acceleration data stored in the acceleration history storage means. The object moving means moves the object according to the moving speed determined by the moving speed determination means.

In a ninth aspect, wherein the input device includes a control button (72) for outputting predetermined control data (Db) when pressed down by a player. The obtaining means further obtains the control data from the input device (S51). The swing detection means detects a swing of the input device when the acceleration represented by the acceleration data satisfies the predetermined condition while the control data indicating that a predetermined control button (72*i*) is pressed down is being obtained (Yes in S53).

A tenth aspect of the present embodiment is directed to a storage medium storing a game program to be executed by a computer (10) of a game device for performing a game process by using acceleration data outputted from a multi-axis acceleration sensor provided in an input device. The game program instructs the computer to function as obtaining means, swing detection means, type determination means, object moving means, and display control means. The obtaining means obtains the acceleration data from the input device. The swing detection means detects a swing of the input device in a real space when an acceleration represented by the acceleration data satisfies a predetermined condition. The type determination means determines a type of swing of the input device in the real space by using an acceleration in a predetermined axial direction of the multi-axis acceleration sensor among all the accelerations represented by the acceleration data obtained by the obtaining means after the detection by the swing detection means. The object moving means moves a predetermined object in a virtual game space according to the type determined by the type determination means. The display control means displays the virtual game space with the object therein on a display device.

In an eleventh aspect, wherein the type determination means determines the type based on the acceleration in the predetermined axial direction represented by the acceleration data, which is obtained by the obtaining means during a predetermined period of time after the detection by the swing detection means.

In a twelfth aspect based on the tenth aspect, wherein the type determination means selects one type from among a plurality of types pre-defined based on a twist given to the input device assembly when the input device is swung in the real space, based on the acceleration in the predetermined axial direction.

In a thirteenth aspect, wherein the type determination means selects one type from among the plurality of types based on a comparison between a predetermined threshold value and the acceleration in the predetermined axial direction.

In a fourteenth aspect, wherein the type determination means determines, in advance, a first threshold value to be greater than a reference value and a second threshold value to be smaller than the reference value so that a difference between the first threshold value and the reference value is different from a difference between the second threshold value and the reference value, wherein the reference value is a value of the acceleration in the predetermined axial direction occurring when the input device is swung with no twist being given to the input device assembly. The type determination means selects one of the plurality of types based on a comparison between the first and second threshold values and the acceleration in the predetermined axial direction.

In a fifteenth aspect, wherein the predetermined axial direction is a direction perpendicular to a direction of an axis about which the input device assembly is twisted.

In a sixteenth aspect, wherein the object moving means includes change-of-direction type selecting means. The change-of-direction type selecting means selects one of a plurality of change-of-direction types based on the type determined by the type determination means, each change-of-direction type representing a direction in which a movement direction of the object changes in the virtual game space. The object moving means moves the object in the virtual game space according to the change-of-direction type selected by the change-of-direction type selecting means.

In a seventeenth aspect, wherein the game program instructs the computer to function further as acceleration history storage control means and moving speed determination means. The acceleration history storage means stores in a memory (12, 35) a history of acceleration data obtained by the obtaining means over a predetermined period of time. The moving speed determination means determines a moving speed of the object in the virtual game space based on changes in an acceleration in the predetermined axial direction and that in an axial direction other than the predetermined axial direction among all the accelerations represented by the history of acceleration data stored in the memory. The object moving means moves the object according to the moving speed determined by the moving speed determination means.

In an eighteenth aspect, wherein the input device includes a control button for outputting predetermined control data when pressed down by a player. The obtaining means further obtains the control data from the input device. The swing detection means detects a swing of the input device when the acceleration represented by the acceleration data satisfies the predetermined condition while the control data indicating that a predetermined control button is pressed down is being obtained.

According to the first aspect, it is possible to determine the type of swing of the input device provided with the multi-axis acceleration sensor in the real space by using the detected acceleration in the predetermined axial direction. By moving the object using the determined type, it is possible to realize a control input that is more intuitive and simpler for the player.

According to the second aspect, the swing type of the input device is determined by using only the acceleration in the predetermined axial direction occurring during a period of time that is necessary for determining the type, thus enabling an appropriate type determination. For example, by using the acceleration occurring during a period of time from the start of the swing of the input device to the release of the ball, it is possible to determine the type of twist given to the ball when the ball is thrown in a realistic manner.

According to the third aspect, it is possible to make an input intuitively through a simple operation such as simply swinging the input device while twisting the input device.

According to the fourth aspect, the type is determined based on a comparison between a threshold value and the acceleration in the predetermined axial direction, thereby simplifying the type determination process.

According to the fifth aspect, it is possible to realize a determination in consideration of the natural movement of a human arm swinging the input device while twisting the input device.

According to the sixth aspect, the acceleration occurring in a predetermined axial direction changes according to a twist when the input device assembly is swung while being twisted, whereby it is possible to easily detect the presence/absence of a twist based only on the acceleration occurring in the predetermined axial direction. If the predetermined axial direction before the input device assembly is twisted is also perpendicular to the swing direction, the acceleration occurring in the predetermined axial direction changes differently according to the twist direction, whereby it is possible to easily detect the twist direction based only on the acceleration occurring in the predetermined axial direction.

According to the seventh aspect, the type of the movement of the object (e.g., the type of pitch thrown by a pitcher) is selected based on the determined swing type of the input device. Therefore, the change of direction of the object can be controlled based on the swing type by the player swinging the input device while twisting the input device, thus facilitating such a control operation as a pitcher throwing a breaking ball, for example.

According to the eighth aspect, it is possible to determine both the moving direction and the moving speed of an object through a simple operation of swinging the input device.

According to the ninth aspect, it is possible to prevent an erroneous determination, which may otherwise occur when the player inadvertently swings the input device without intending to perform a control operation. Moreover, the player is required to press down a predetermined control button when holding the input device in hand, thus naturally forcing the player to hold the input device in an intended manner.

With a storage medium storing a game program of the present embodiment, it is possible to realize advantageous effects similar to those described above for the game device of the present embodiment.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 2 is a functional block diagram showing a game device main unit 5 of FIG. 1.

FIG. 7 is a block diagram showing a configuration of the controller 7 of FIG. 3; FIG. 8 generally shows how the player uses the controller 7 of FIG. 3 to perform a game operation;

FIG. 9 shows the controller 7 being held by the player in a reference position.

FIG. 14 shows important data to be stored in a main memory of the game device main unit 5 of FIG. 2;

FIG. 18 shows an example of a ball speed definition table;

FIG. 19 shows an example of a shooting direction definition table;

DESCRIPTION OF THE PREFERRED EMBODIMENTS

Figure 1:
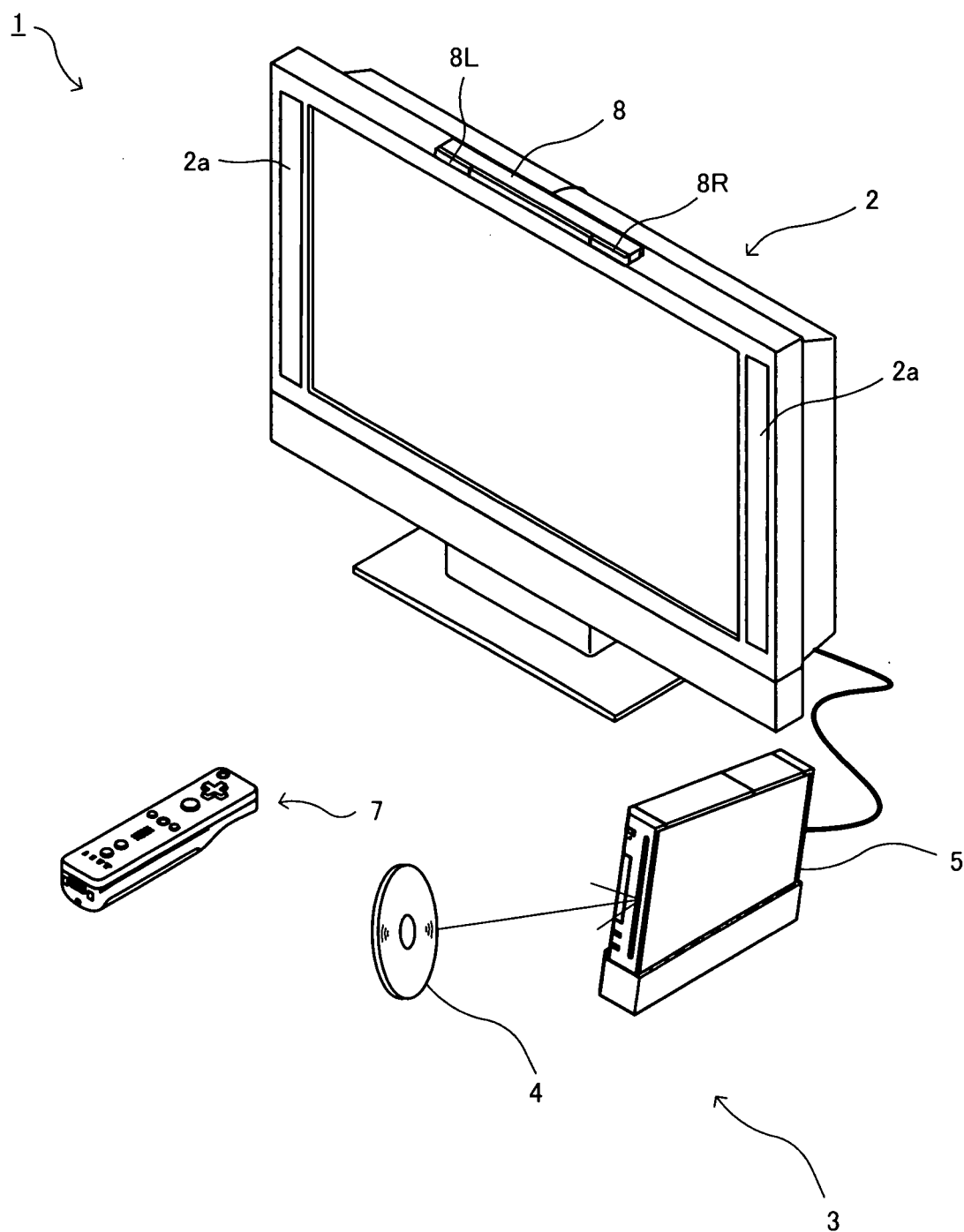
FIG. 1 shows an external view of a game system 1 in one embodiment.

Referring to FIG. 1, a device for executing a game program in one embodiment will now be described. For the purpose of illustration, the following description is directed to a game system including a home-console type game device main unit 5, being an example of the device of the present invention. FIG. 1 shows an external view of a game system 1 including a home-console type game device 3, and FIG. 2 is a block diagram showing the game device main unit 5. The game system 1 will now be described below.

Referring to FIG. 1, the game system 1 includes a home television receiver (hereinafter a "monitor") 2 being an example of the display means, and the home-console type game device 3 connected to the monitor 2 via a connection cord. The monitor 2 includes a speaker 2a for outputting an audio signal outputted from the game device main unit 5. The game device 3 includes an optical disc 4 storing the game program of the present invention, the game device main unit 5 having a computer for executing the game program in the optical disc 4 to output the obtained game image to the monitor 2, and the controller 7 for giving the game device main unit 5 control information that is necessary in a game where the player controls a character, or the like, displayed on the game screen.

The game device main unit 5 also includes a wireless controller module 19 (see FIG. 2). The wireless controller module 19 receives data wirelessly transmitted from the controller 7 and transmits data from the game device main unit 5 to the controller 7, thereby wirelessly connecting the controller 7 with the game device main unit 5. The game device main unit 5 uses the optical disc 4, being an example of an information storage medium, that can be received by the game device main unit 5.

The game device main unit 5 also includes a flash memory 17 (see FIG. 2) serving as a backup memory for statically storing data such as save data. The game device main unit 5 executes a game program, or the like, stored in the optical disc 4 to display the obtained result on the monitor 2 as a game image. The game program, or the like, is not limited to those stored in the optical disc 4 but may be a program prestored in the flash memory 17. The game device main unit 5 may reproduce a past game status from save data stored in the flash memory 17 to display the obtained game image on the monitor 2. Then, the player of the game device main unit 5 can enjoy the game process by operating the controller 7 while watching the game image displayed on the monitor 2.

The controller 7 wirelessly transmits transmit data, such as control information, to the game device main unit 5 including the wireless controller module 19 by means of Bluetooth (registered trademark), for example. The controller 7 is control means for controlling primarily a player character, or the like, to be present in the game space displayed on the display screen of the monitor 2. The controller 7 includes a housing of such a size that the controller 7 can be held in one hand, and a plurality of control buttons (including a cross-shaped key, a stick, etc.) exposed on the surface of the housing. As will be more apparent from the following description, the controller 7 includes an image capturing/processing section 74 for capturing an image as viewed from the controller 7. As an example of imaging targets to be captured by the image capturing/processing section 74, two LED modules (hereinafter "markers") 8L and 8R are provided around the display screen of the monitor 2. The markers 8L and 8R output infrared light, for example, to the front side of the monitor 2. Alternatively, the controller 7 can receive, at a communications section 75 thereof, the transmit data wirelessly transmitted from the wireless controller module 19 of the game device main unit 5, thereby generating a sound or a vibration according to the transmit data.

Referring now to FIG. 2, the internal configuration of the game device main unit 5 will be described. FIG. 2 is a block diagram showing a configuration of the game device main unit 5. The game device main unit 5 includes a CPU (Central Processing Unit) 10, a system LSI (Large Scale Integration) 11, an external main memory 12, a ROM/RTC (Read Only Memory/Real Time Clock) 13, a disc drive 14, and an AV-IC (Audio Video-Integrated Circuit) 15, etc.

The CPU 10 serves as a game processor, and performs game processes by executing the game program stored in the optical disc 4. The CPU 10 is connected to the system LSI 11. The external main memory 12, the ROM/RTC 13, the disc drive 14 and the AV-IC 15 are connected to the system LSI 11, in addition to the CPU 10. The system LSI 11 performs various operations such as controlling data transfers between components connected thereto, producing images to be displayed, and obtaining data from an external device. The internal configuration of the system LSI 11 will be described later. The volatile external main memory 12 is used as a work area or a buffer area for the CPU 10, and stores various data or programs such as game programs loaded from the optical disc 4 or the flash memory 17. The ROM/RTC 13 includes a ROM (a so-called "boot ROM") storing a boot program for the game device main unit 5, and a clock circuit (RTC) for keeping the time. The disc drive 14 reads out program data, texture data, etc., from the optical disc 4, and writes the readout data in an internal main memory 35 to be described later or the external main memory 12.

The system LSI 11 includes an input/output processor 31, a GPU (Graphics Processor Unit) 32, a DSP (Digital Signal Processor) 33, a VRAM (Video RAM) 34, and the internal main memory 35. Although not shown in the figure, these components 31 to 35 are connected together via an internal bus.

The GPU 32 forms a part of the rendering means, and produces an image according to a graphics command (drawing instruction) from the CPU 10. The VRAM 34 stores data necessary for the GPU 32 to execute graphics commands (data such as polygon data or texture data). When an image is produced, the GPU 32 produces the image data using the data stored in the VRAM 34.

The DSP 33 serves as an audio processor, and produces audio data by using the sound data or sound waveform (tone) data stored in the internal main memory 35 or the external main memory 12.

The image data and the audio data produced as described above are read out by the AV-IC 15. The AV-IC 15 outputs the readout image data to the monitor 2 via an AV connector 16, and outputs the readout audio data to the speaker 2a provided in the monitor 2. Thus, the image is displayed on the monitor 2 and the sound is outputted from the speaker 2a.

An input/output processor (I/O processor) 31 exchanges data between components connected thereto, and downloads data from an external device. The input/output processor 31 is connected to the flash memory 17, a wireless communications module 18, the wireless controller module 19, an extension connector 20, and an external memory card connector 21. An antenna 22 is connected to the wireless communications module 18, and an antenna 23 is connected to the wireless controller module 19.

The input/output processor 31 can be connected to a network via the wireless communications module 18 and the antenna 22, and communicate with other game devices and servers connected to the network. The input/output processor 31 periodically accesses the flash memory 17 to detect the presence/absence of data that needs to be transmitted to the network. If such data is present, the input/output processor 31 transmits the data to the network via the wireless communications module 18 and the antenna 22. The input/output processor 31 receives data from other game devices or data downloaded from a download server via a network, the antenna 22 and the wireless communications module 18, and stores the received data in the flash memory 17. The CPU 10 executes a game program to thereby read out data from the flash memory 17, which is used in the game program. The flash memory 17 may store data exchanged between the game device main unit 5 and other game devices or various servers, as well as save data of a game played with the game device main unit 5 (game result data or intermediate save data).

The input/output processor 31 receives control data, or the like, transmitted from the controller 7 via the antenna 23 and the wireless controller module 19, and (temporarily) stores the data in the internal main memory 35 or the buffer area of the external main memory 12. As does the external main memory 12, the internal main memory 35 may store a program, such as a game program read out from the optical disc 4 or a game program read out from the flash memory 17, or various types of data, or may be used as a work area or a buffer area of the CPU 10.

Moreover, the extension connector 20 and the external memory card connector 21 are connected to the input/output processor 31. The extension connector 20 is a connector for interfaces such as USB and SCSI, to which media such as external storage media or peripheral devices such as other controllers can be connected, and a wired communications connector can be connected thereto to thereby communicate with a network instead of the wireless communications module 18. The external memory card connector 21 is a connector to which an external storage medium such as a memory card can be connected. For example, the input/output processor 31 can access an external storage medium via the extension connector 20 or the external memory card connector 21 for saving or loading data.

Provided on the game device main unit 5 (e.g., on the front principal plane thereof) are a power button 24 of the game device main unit 5, a reset button 25 for resetting a game process, a slot for receiving the optical disc 4, an eject button 26 for ejecting the optical disc 4 out of the slot of the game device main unit 5, etc. The power button 24 and the reset button 25 are connected to the system LSI 11. When the power button 24 is turned ON, components of the game device main unit 5 are powered via an AC adaptor (not shown). When the reset button 25 is pressed, the system LSI 11 restarts the boot program of the game device main unit 5. The eject button 26 is connected to the disc drive 14. When the eject button 26 is pressed, the optical disc 4 is ejected from the disc drive 14.

Figure 3:
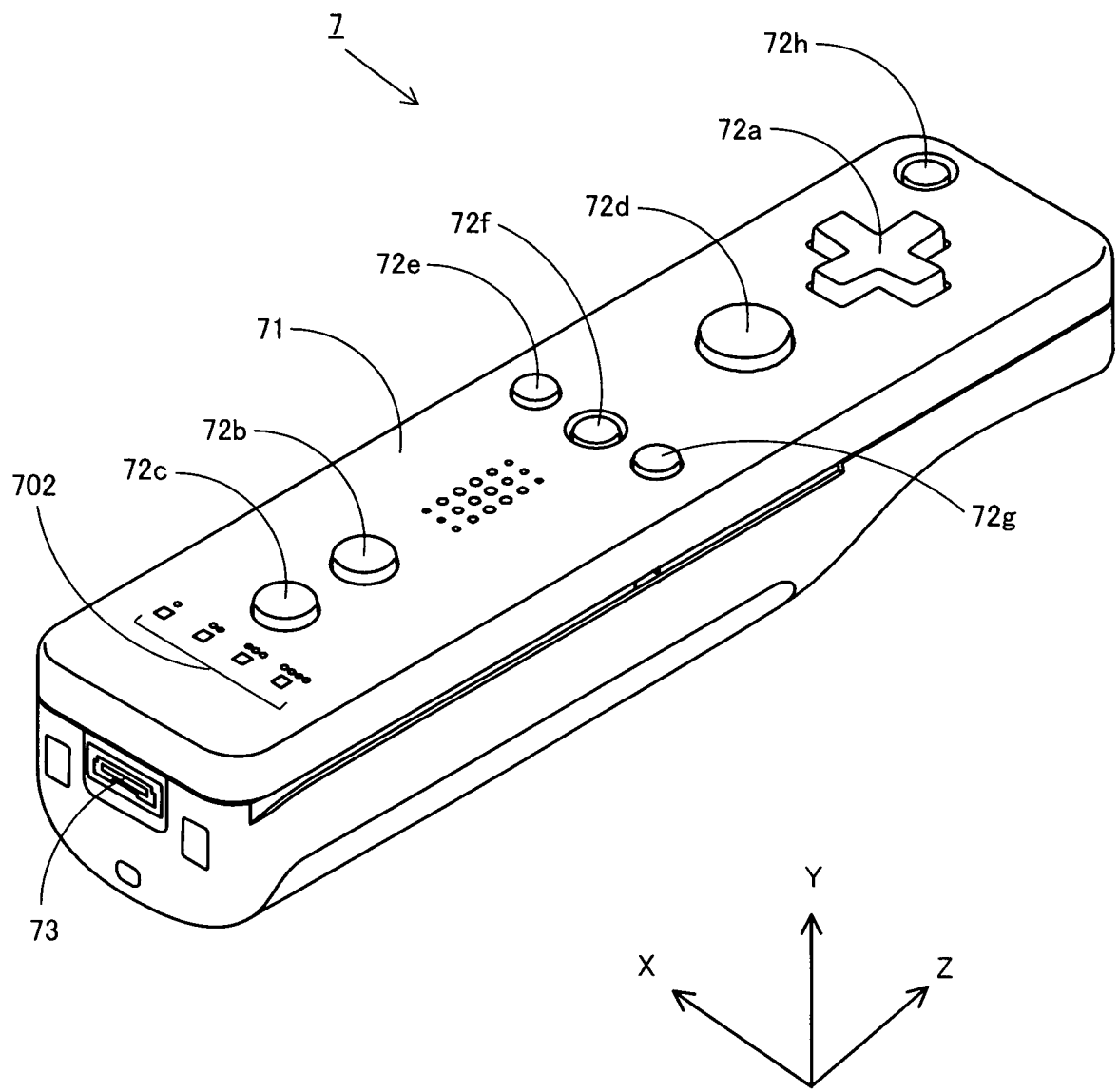
FIG. 3 is a perspective view showing a controller 7 of FIG. 1 as viewed from the upper rear side.
Figure 4:
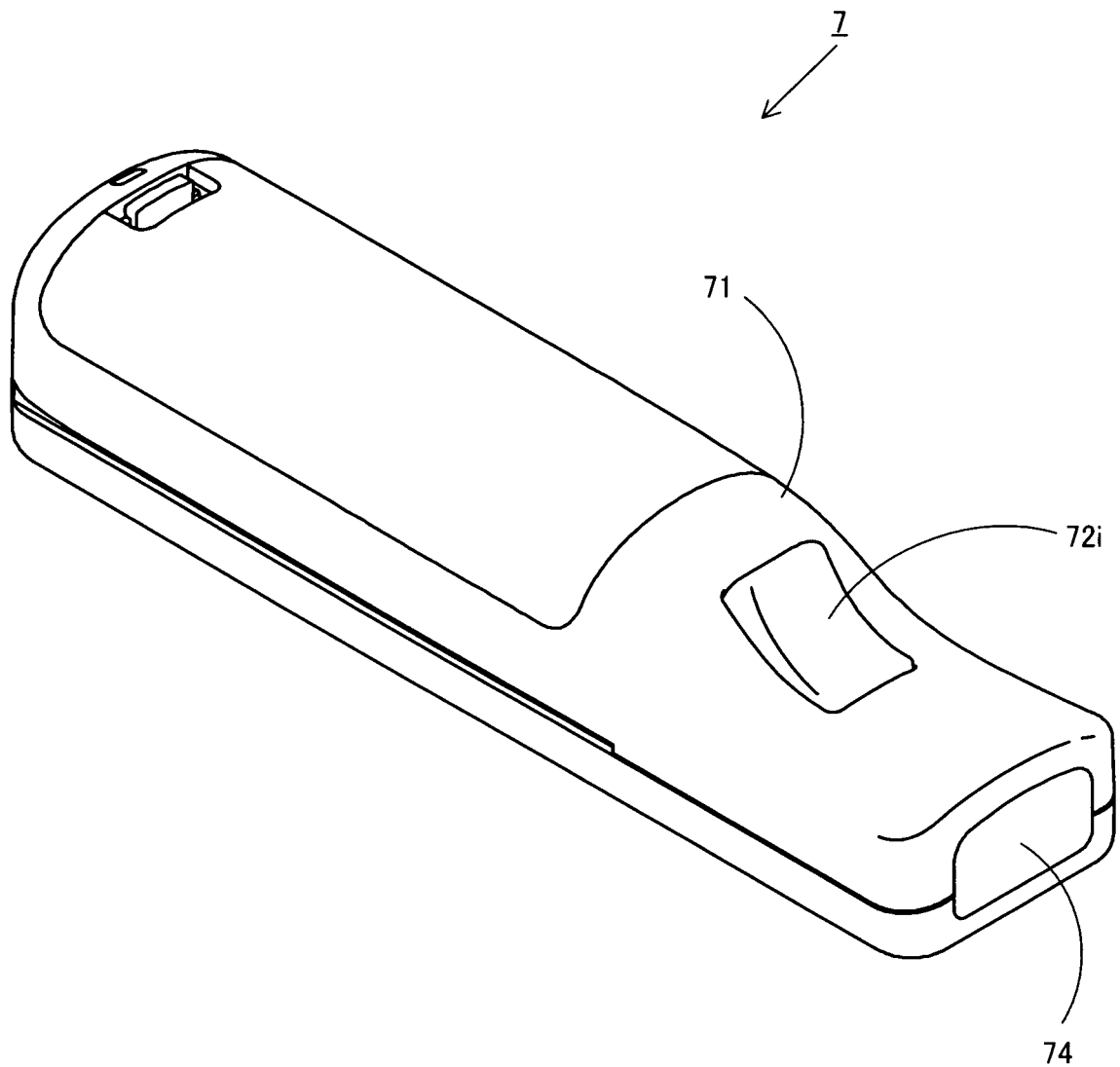
FIG. 4 is a perspective view showing the controller 7 of FIG. 3 as viewed from the lower front side.

Referring to FIGS. 3 and 4, the controller 7 will be described. FIG. 3 is a perspective view showing the controller 7 as viewed from the upper rear side. FIG. 4 is a perspective view showing the controller 7 as viewed from the lower front side.

The controller 7 shown in FIGS. 3 and 4 includes a housing 71 formed by molding a plastic material, for example, with a plurality of control sections 72 provided on the housing 71. The housing 71 has a generally rectangular parallelepiped shape, with the longitudinal direction being the front-rear direction, and has an overall size such that it can be held in a hand of an adult or a child.

A cross-shaped key 72a is provided on the upper surface of the housing 71, centered in the left-right direction and near the front end. The cross-shaped key 72a is a cross-shaped four-way push switch, in which four control portions associated with four different directions (forward, backward, left and right) are provided in the protruding portions of the cross shape while being spaced apart from one another by 90°. The player can select one of the forward, backward, left and right directions by pressing down a corresponding one of the control portions of the cross-shaped key 72a. For example, the player can control the cross-shaped key 72a to move a player character, etc., in a virtual game world in a certain direction, or make a selection from among a plurality of options.

While the cross-shaped key 72a is a control section that outputs an operation signal according to a direction input operation by the player, it may be any other suitable type of a control section. For example, the control section may include four push switches arranged in a cross-shaped pattern so as to output an operation signal according to the push switch being pressed by the player. Alternatively, in addition to the four push switches, a center switch may be provided at the center of the cross-shaped push switch arrangement, thus providing a control section including four push switches combined with a center switch. Alternatively, the cross-shaped key 72a may be replaced by a stick-shaped control section (so-called a "joy stick") protruding from the upper surface of the housing 71, which outputs an operation signal according to the direction in which it is tilted. Alternatively, the cross-shaped key 72a may be replaced by a horizontally-movable (slidable) disc-shaped control section, which outputs an operation signal according to the direction in which it is slid. Alternatively, the cross-shaped key 72a may be replaced by a touch pad.

A plurality of control buttons 72b to 72g are provided on the upper surface of the housing 71, closer to the rear end with respect to the cross-shaped key 72a. The control buttons 72b to 72g are control sections, each of which outputs an operation signal associated therewith when being pressed by the player. For example, the control buttons 72b to 72d may be assigned a function as a first button, a second button and an A button, respectively. For example, the control buttons 72e to 72g may be assigned a function as a minus button, a home button and a plus button, respectively. Each of the control buttons 72a to 72g is assigned a function as specified in the game program executed by the game device main unit 5. In the arrangement shown in FIG. 3, the control buttons 72b to 72d are arranged in the forward-backward direction while being centered in the left-right direction on the upper surface of the housing 71. The control buttons 72e to 72g are arranged in the left-right direction between the control buttons 72b and 72d on the upper surface of the housing 71. The control button 72f is buried under the upper surface of the housing 71 so as to prevent the player from pressing the button unintentionally.

A control button 72h is provided on the upper surface of the housing 71, closer to the front end with respect to the cross-shaped key 72a. The control button 72h is a power switch for remotely turning ON/OFF the power of the game device main unit 5 from a remote position. The control button 72h is also buried under the upper surface of the housing 71 so as to prevent the player from pressing the button unintentionally.

A plurality of LEDs 702 are provided on the upper surface of the housing 71, closer to the rear end with respect to the control button 72c. The controller 7 is given a controller ID (number) for identifying the controller 7 from others. The LEDs 702 may, for example, be used for notifying the player of the controller ID being currently assigned to the controller 7. Specifically, when transmit data is transmitted from the controller 7 to the communications unit 6, one or more of the LEDs 702 are lit depending on the controller ID.

Sound slits are formed in the upper surface of the housing 71 between the control button 72b and the control buttons 72e to 72g for allowing the sound from a speaker (a speaker 706 in FIG. 5) to be described later to pass therethrough.

A depressed portion is formed on the lower surface of the housing 71. The depressed portion of the lower surface of the housing 71 is located where the index or middle finger of the player lies when the player holds the controller 7 from the front side thereof aiming toward the markers 8L and 8R. A control button 72i is provided on a slope on the rear side of the depressed portion. For example, the control button 72i is a control section that functions as a B button.

An image sensing device 743, forming a part of the image capturing/processing section 74, is formed on the front side of the housing 71. The image capturing/processing section 74 is a system for analyzing image data obtained by the controller 7 to determine each spot with high luminance and then to detect the centroid and the size thereof, and has a maximum sampling frequency of about 200 frames per second, for example, and is thus capable of following fast movements of the controller 7. The details of the configuration of the image capturing/processing section 74 will be described later. A connector 73 is provided on the rear side of the housing 71. The connector 73 is, for example, an edge connector, and is used for connection between the controller 7 and a connection cable, which can be fitted into the connector 73.

A coordinate system used herein with respect to the controller 7 will be defined below. An x, y and z axis are defined with respect to the controller 7 as shown in FIGS. 3 and 4. Specifically, the z axis is defined along the longitudinal direction of the housing 71, being the front-rear direction of the controller 7, and the direction from the rear surface to the front surface (the surface on which the image capturing/processing section 74 is provided) of the controller 7 is defined as the z-axis positive direction. The y axis is defined along the up-down direction of the controller 7, and the direction from the upper surface to the lower surface (the surface on which the control button 72a is provided) of the housing 71 is defined as the y-axis positive direction. The x axis is defined along the left-right direction of the controller 7, and the direction from the right side to the left side (the side which is hidden in FIG. 3) of the housing 71 is defined as the x-axis positive direction.

Figure 5:
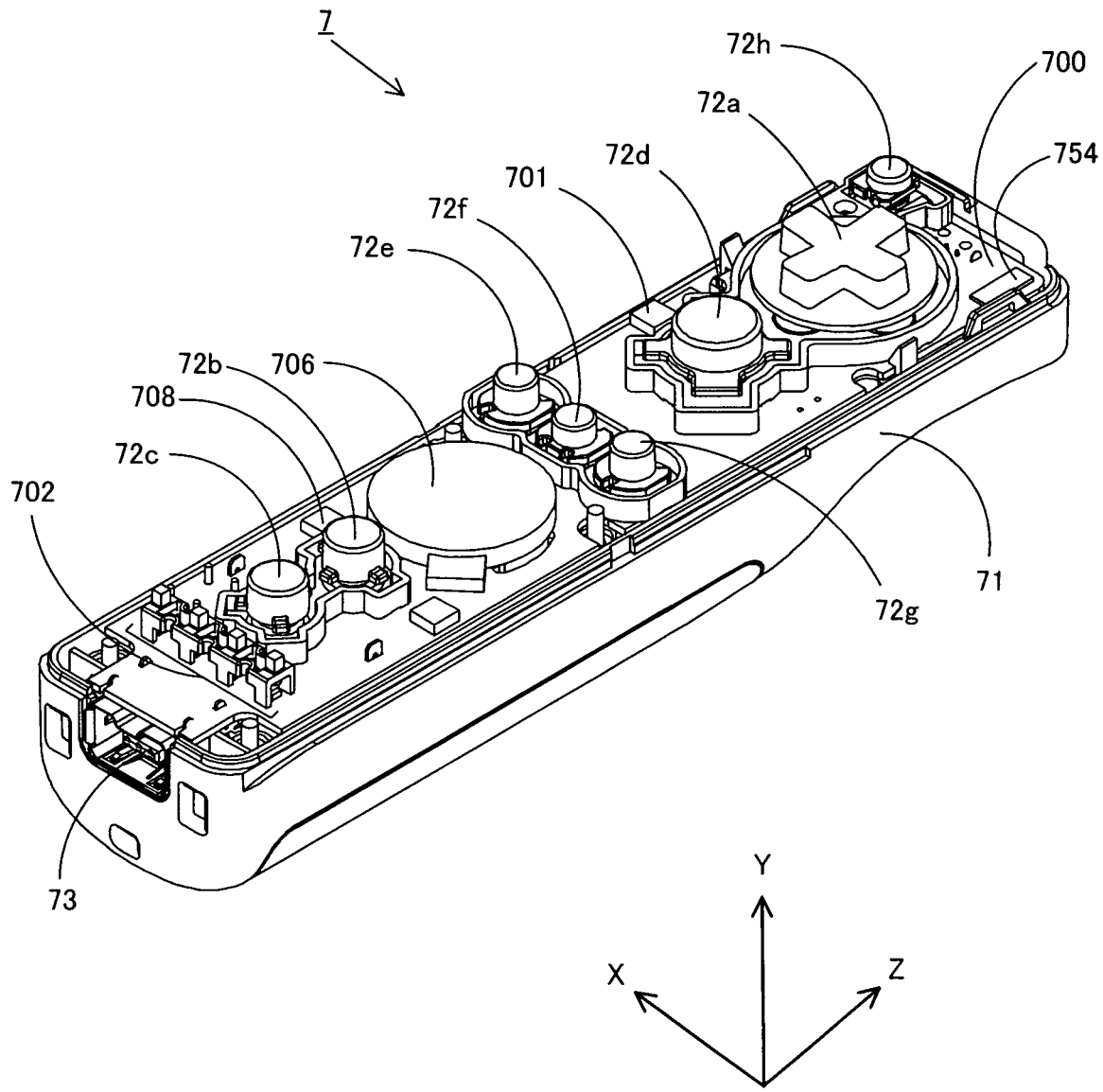
FIG. 5 is a perspective view showing the controller 7 of FIG. 3 with an upper casing taken off.
Figure 6:
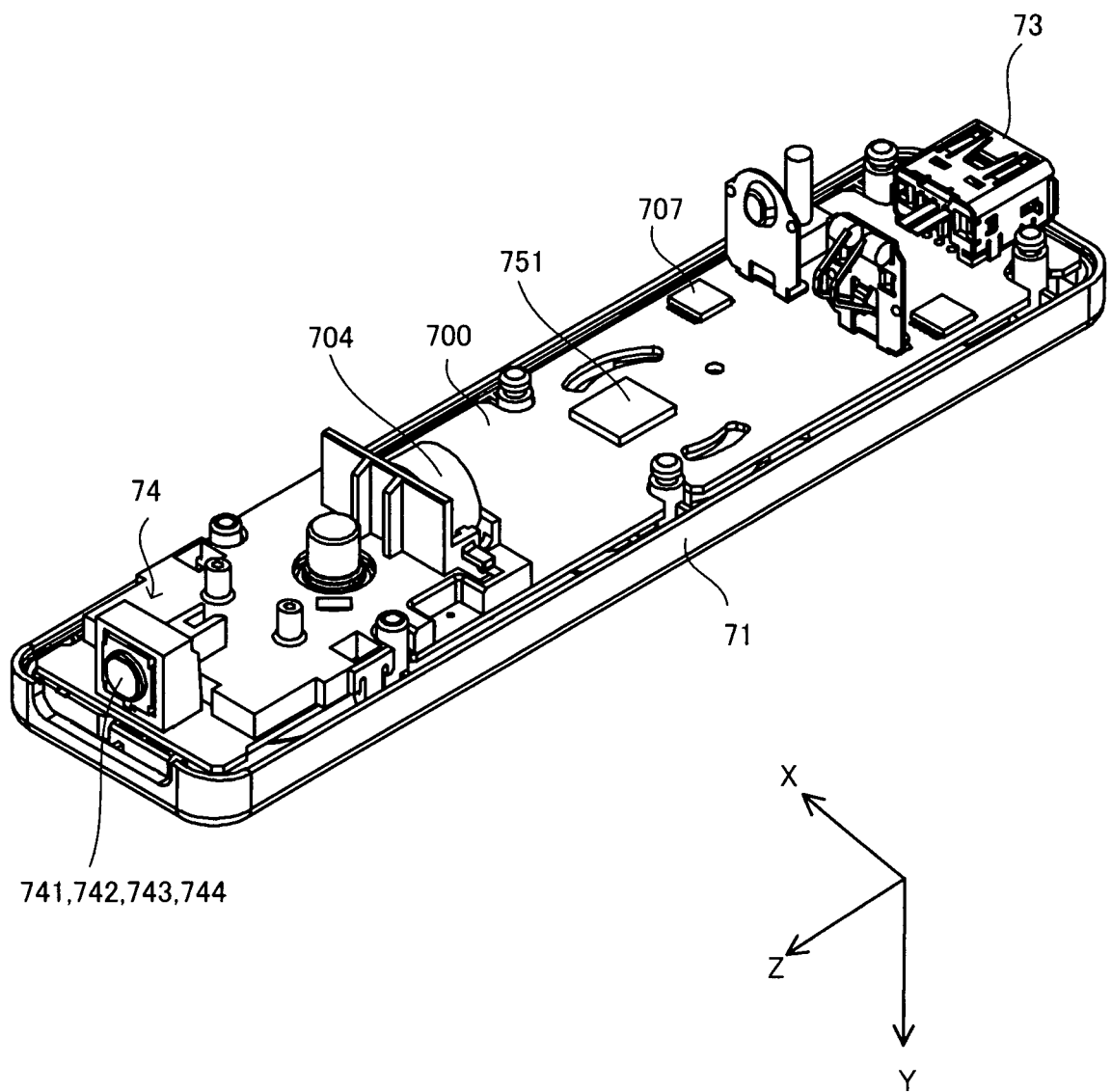
FIG. 6 is a perspective view showing the controller 7 of FIG. 4 with a lower casing taken off.

Referring now to FIGS. 5 and 6, an internal configuration of the controller 7 will be described. FIG. 5 is a perspective view showing the controller 7 with an upper casing (a part of the housing 71) taken off, as viewed from the rear side. FIG. 6 is a perspective view showing the controller 7 with a lower casing (a part of the housing 71) taken off, as viewed from the front side. FIG. 5 shows one side of a substrate 700, and FIG. 6 shows the other side thereof.

In FIG. 5, the substrate 700 is secured in the housing 71, and the control buttons 72a to 72h, an acceleration sensor 701, the LEDs 702, an antenna 754, etc., are provided on the upper principal plane of the substrate 700. These components are connected to a microcomputer 751 (see FIGS. 6 and 7), etc., via lines (not shown) formed on the substrate 700, etc. With a wireless module 753 (see FIG. 7) and the antenna 754, the controller 7 can function as a wireless controller. A quartz oscillator (not shown) is provided inside the housing 71, and generates a basic clock for the microcomputer 751 to be described later. The speaker 706 and an amplifier 708 are provided on the principal surface of the substrate 700. The acceleration sensor 701 is provided on the left side of the control button 72d on the substrate 700 (i.e., in a peripheral portion, but not a central portion, of the substrate 700). Therefore, as the controller 7 rotates about an axis in the longitudinal direction, the acceleration sensor 701 can detect the acceleration including a centrifugal component, in addition to the change in the direction of the gravitational acceleration, whereby the game device main unit 5, etc., can determine, with a desirable sensitivity, the rotation of the controller 7 based on the detected acceleration data by using a predetermined calculation.

Referring to FIG. 6, the image capturing/processing section 74 is provided at the front edge on the lower principal plane of the substrate 700. The image capturing/processing section 74 includes an infrared filter 741, a lens 742, the image sensing device 743 and an image processing circuit 744 provided in this order from the front side of the controller 7, and these components are provided on the lower principal plane of the substrate 700. The connector 73 is provided at the rear edge on the lower principal plane of the substrate 700. A sound IC 707 and the microcomputer 751 are provided on the lower principal surface of the substrate 700. The sound IC 707 is connected to the microcomputer 751 and the amplifier 708 via a line formed on the substrate 700, etc., and outputs a sound signal to the speaker 706 via the amplifier 708 according to sound data transmitted from the game device main unit 5.

A vibrator 704 is attached to the lower principal surface of the substrate 700. The vibrator 704 may be, for example, a vibrating motor or a solenoid. The vibrator 704 is connected to the microcomputer 751 via a line formed on the substrate 700, etc., and is turned ON/OFF based on the vibration data transmitted from the game device main unit 5. As the vibrator 704 is actuated, the controller 7 is vibrated, and the vibration is transmitted to the hand of the player holding the controller 7, thus realizing a game with vibration feedback. The vibrator 704 is positioned slightly closer to the front edge of the housing 71, whereby the housing 71 can vibrate more powerfully while the housing 71 is being held by the player, who is thus more likely to feel the vibration.

Referring now to FIG. 7, an internal configuration of the controller 7 will be described. FIG. 7 is a block diagram showing a configuration of the controller 7.

Referring to FIG. 7, in addition to the control section 72, the image capturing/processing section 74, the acceleration sensor 701, the vibrator 704, the speaker 706, the sound IC 707 and the amplifier 708, the controller 7 includes therein the communications section 75.

The image capturing/processing section 74 includes the infrared filter 741, the lens 742, the image sensing device 743 and the image processing circuit 744. The infrared filter 741 passes only an infrared portion of incident light entering the controller 7 from the front side. The lens 742 condenses the infrared light passing through the infrared filter 741, and outputs the condensed infrared light to the image sensing device 743. The image sensing device 743 is a solid-state image sensing device, such as a CMOS sensor or a CCD, for capturing the infrared light condensed through the lens 742. Therefore, the image sensing device 743 produces image data by capturing only the infrared light that has passed through the infrared filter 741. The image data produced by the image sensing device 743 is processed in the image processing circuit 744. Specifically, the image processing circuit 744 processes the image data obtained from the image sensing device 743 to detect high-luminance portions and obtain positions and areas thereof, and the image processing circuit 744 outputs the process result data representing the obtained positions and areas to the communications section 75. The image capturing/processing section 74 is secured in the housing 71 of the controller 7, and the image-capturing direction can be changed by changing the direction of the housing 71 itself.

It is preferred that the controller 7 includes a 3-axis (x, y and z) acceleration sensor 701. The acceleration sensor 701 detects the linear acceleration in each of three directions, i.e., the up-down direction (the Y-axis direction shown in FIG. 3), the left-right direction (the X-axis direction shown in FIG. 3) and the forward-backward direction (the Z-axis direction shown in FIG. 3). In other embodiments, the acceleration sensor 701 may be acceleration detection means capable of detecting the linear acceleration in at least two axis directions, depending on the types of control signals used in the game process. For example, the acceleration sensor 701 may be of the type available from Analog Devices, Inc., or STMicroelectronics N.V. The acceleration sensor 701 may be a capacitance type (capacitance-coupling type) sensor based on the technique of MEMS (MicroElectroMechanical Systems) using a silicon microfabrication process. However, the acceleration sensor 701 may be provided by other existing acceleration detection means (e.g., a piezoelectric sensor or a piezoelectric resistance sensor) or any suitable technique to be developed in the future.

As is known to those skilled in the art, acceleration detection means of a type that is used as the acceleration sensor 701 is capable of detecting only an acceleration along a straight line corresponding to each of the axes of the acceleration sensor (linear acceleration). Thus, the output directly from the acceleration sensor 701 is a signal representing the linear acceleration (static or dynamic) along each of the three axes. Therefore, the acceleration sensor 701 cannot directly detect a physical property, e.g., the movement, rotation, revolution, angular displacement, inclination, position or orientation, along a non-linear (e.g., arc-shaped) path.

However, it will be readily understood by those skilled in the art upon reading the present embodiment that other information regarding the controller 7 can be estimated or calculated (determined) with a computer, such as the processor of the game device (e.g., the CPU 10) or the processor of the controller (e.g., the microcomputer 751), performing an additional operation on an acceleration signal outputted from the acceleration sensor 701.

For example, where the process is performed on the computer side while assuming that the controller 7 including the acceleration sensor 701 is in a static state (i.e., where the process is performed while assuming that only gravitational acceleration is detected by the acceleration sensor 701), if the controller 7 is actually in a static state, it is possible to determine whether the orientation of the controller 7 is inclined with respect to the direction of gravity and to determine how much the inclination is. Specifically, with the reference position being where the detection axis of the acceleration sensor 701 is directed in the vertically downward direction, it is possible to determine whether the controller 7 is inclined with respect to the vertically downward direction based only on whether 1 G (the gravitational acceleration) is acting in the direction of the detection axis. Moreover, based on the magnitude of the acceleration acting in the direction of the detection axis, it is possible to determine the degree of inclination of the controller 7 with respect to the vertically downward direction. Where the acceleration sensor 701 is capable of detecting accelerations in multiple axial directions, it is possible to more specifically determine the degree of inclination of the controller 7 with respect to the direction of gravity by processing acceleration signals detected for different axes. In such a case, the process of calculating the data of the inclination angle of the controller 7 may be performed by a processor based on the output from the acceleration sensor 701, or the approximate degree of inclination of the controller 7 may be estimated based on the output from the acceleration sensor 701 without performing the process of calculating the inclination angle data. Thus, by using the acceleration sensor 701 in combination with a processor, it is possible to determine the inclination, orientation or position of the controller 7.

Where it is assumed that the acceleration sensor 701 is in a dynamic state, the acceleration sensor 701 detects an acceleration according to the movement of the acceleration sensor 701 in addition to the gravitational acceleration component. Therefore, it is possible to determine the direction of movement of the controller 7, etc., by removing the gravitational acceleration component through a predetermined process. Specifically, when the controller 7 including the acceleration sensor 701 is moved while being dynamically accelerated with a hand of the player, it is possible to calculate various movements and/or positions of the controller 7 by processing the acceleration signal produced by the acceleration sensor 701. Also where it is assumed that the acceleration sensor 701 is in a dynamic state, it is possible to determine the inclination of the controller 7 with respect to the direction of gravity by removing the acceleration according to the movement of the acceleration sensor 701 through a predetermined process.

In other embodiments, the acceleration sensor 701 may include a built-in or otherwise dedicated signal processing device for performing a desired operation on the acceleration signal outputted from the acceleration detection means provided in the acceleration sensor 701, before outputting the signal to the microcomputer 751. For example, where the acceleration sensor 701 is for detecting a static acceleration (e.g., the gravitational acceleration), the built-in or dedicated signal processing device may be a device for converting the detected acceleration signal to a corresponding inclination angle (or any other desirable parameter). Acceleration data detected by the acceleration sensor 701 is outputted to the communications section 75.

The communications section 75 includes the microcomputer 751, a memory 752, the wireless module 753 and the antenna 754. The microcomputer 751 controls the wireless module 753 for wirelessly transmitting transmit data while using the memory 752 as a memory area. Moreover, the microcomputer 751 controls the sound IC 707 and the vibrator 704 according to the data from the game device main unit 5 received by the wireless module 753 via the antenna 754. The sound IC 707 processes sound data, etc., transmitted from the game device main unit 5 via the communications section 75. The microcomputer 751 controls the vibrator 704 according to vibration data (e.g., a signal for turning ON/OFF the vibrator 704), etc., transmitted from the game device main unit 5 via the communications section 75.

An operation signal (key data) from the control section 72 provided in the controller 7, a 3-axis acceleration signal (the X-, Y- and Z-axis direction acceleration data) from the acceleration sensor 701 and process result data from the image capturing/processing section 74 are outputted to the microcomputer 751. The microcomputer 751 temporarily stores the received data (the key data, the X-, Y- and Z-axis direction acceleration data and the process result data) in the memory 752 as transmit data to be transmitted to the wireless controller module 19. Data are wirelessly transmitted from the communications section 75 to the wireless controller module 19 at regular intervals. Since the game process typically proceeds in a cycle of 1/60 second, the interval should be shorter than 1/60 second. Specifically, the game process proceeds in a cycle of 16.7 ms (1/60 second), and the data transmission interval of the communications section 75 using Bluetooth (registered trademark) is 5 ms. When it is time to transmit data to the wireless controller module 19, the microcomputer 751 outputs, as a series of control information, transmit data stored in the memory 752 to the wireless module 753. The wireless module 753 uses a technique such as Bluetooth (registered trademark) to radiate, from the antenna 754, a radio wave signal representing the control information using a carrier of a predetermined frequency. Thus, the key data from the control section 72 provided in the controller 7, the X-, Y- and Z-axis direction acceleration data from the acceleration sensor 701 and the process result data from the image capturing/processing section 74 are transmitted from the controller 7. The radio wave signal is received by the wireless controller module 19 of the game device main unit 5, and the radio wave signal is demodulated and decoded by the game device main unit 5, thereby obtaining the series of control information (the key data, the X-, Y- and Z-axis direction acceleration data and the process result data). The CPU 10 of the game device main unit 5 performs the game process based on the obtained control information and the game program. Where the communications section 75 uses a Bluetooth (registered trademark) technique, the communications section 75 can also receive transmit data wirelessly transmitted from other devices.

Now, before describing in detail the process performed by the game device main unit 5, the game played on the game device main unit 5 will be outlined. As shown in FIG. 8, the controller 7 has an overall size such that it can be held in a hand of an adult or a child. In order to play the game on the game system 1 using the controller 7, the player holds the controller 7 in one hand and swings the controller 7. For example, FIG. 8 shows the player holding the controller 7 and swinging the controller 7 downward as in a throwing motion of a pitcher. In response to the player swinging down the controller 7, the game device main unit 5 determines the twist direction in the downward swing of the controller 7, and the like, to thereby perform a game process using the twist direction.

For example, the player holds and swings down the controller 7 while holding down the control button 72$i$ (B button) with the index finger or the middle finger as shown in FIG. 9. Then, the player's thumb is naturally located on the upper surface of the controller 7 (e.g., near the cross-shaped key 72$a$). This position of holding the controller 7 is defined as the reference position for operating the controller 7 in the present embodiment. The reference position of the controller 7 shown in FIG. 9 is as seen from the front side of the player when the player holds and swings up the controller 7 in the right hand. The reference position when the player holds the controller 7 in the left hand will be the left-right inversion of FIG. 9, with the player similarly holding down the control button 72*i* with the index finger or the middle finger and with the player's thumb similarly being located on the upper surface of the controller 7.

Figure 10:
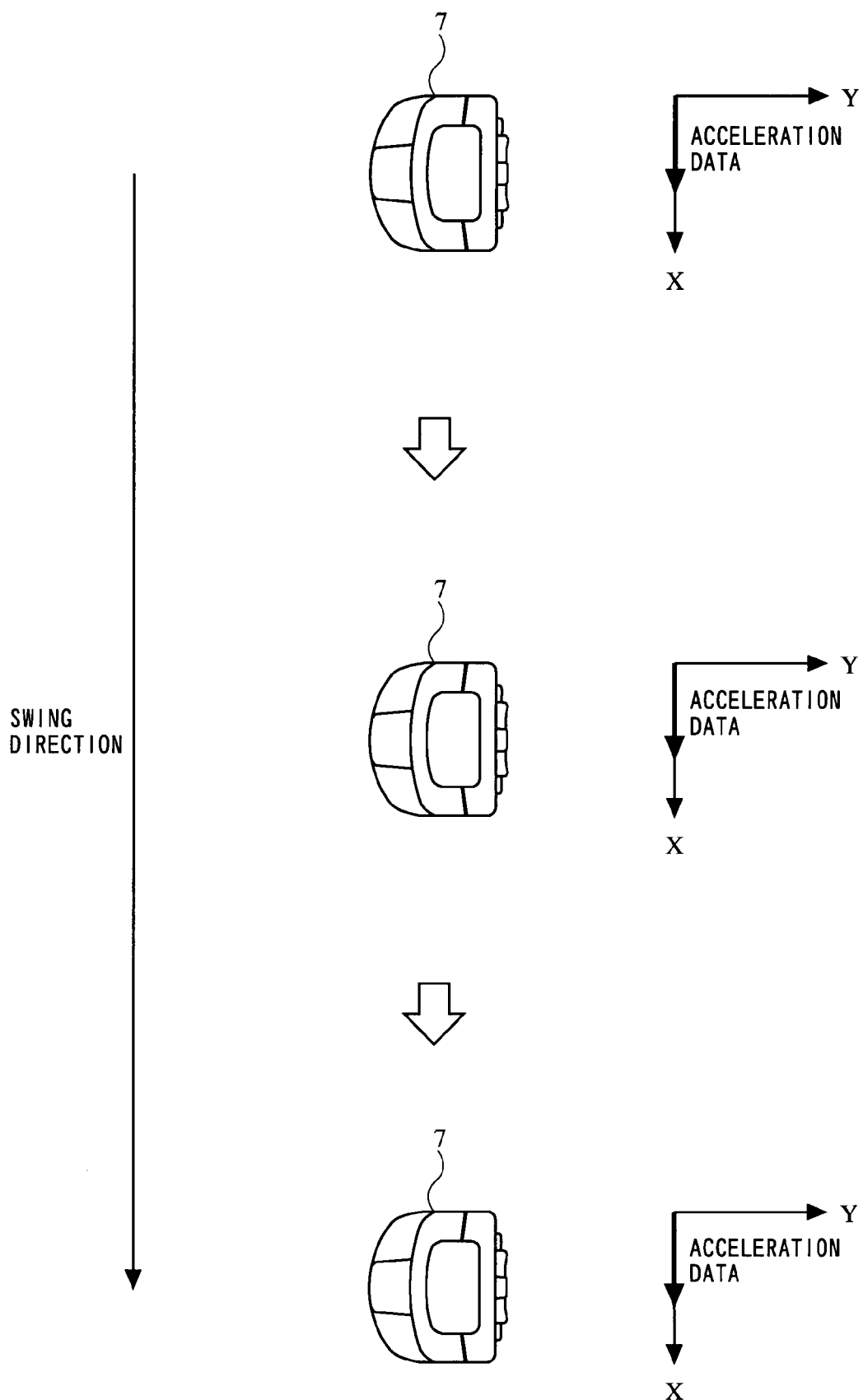
FIG. 10 shows the controller 7 being swung down from the reference position by the right hand of the player with no twist.
Figure 11:
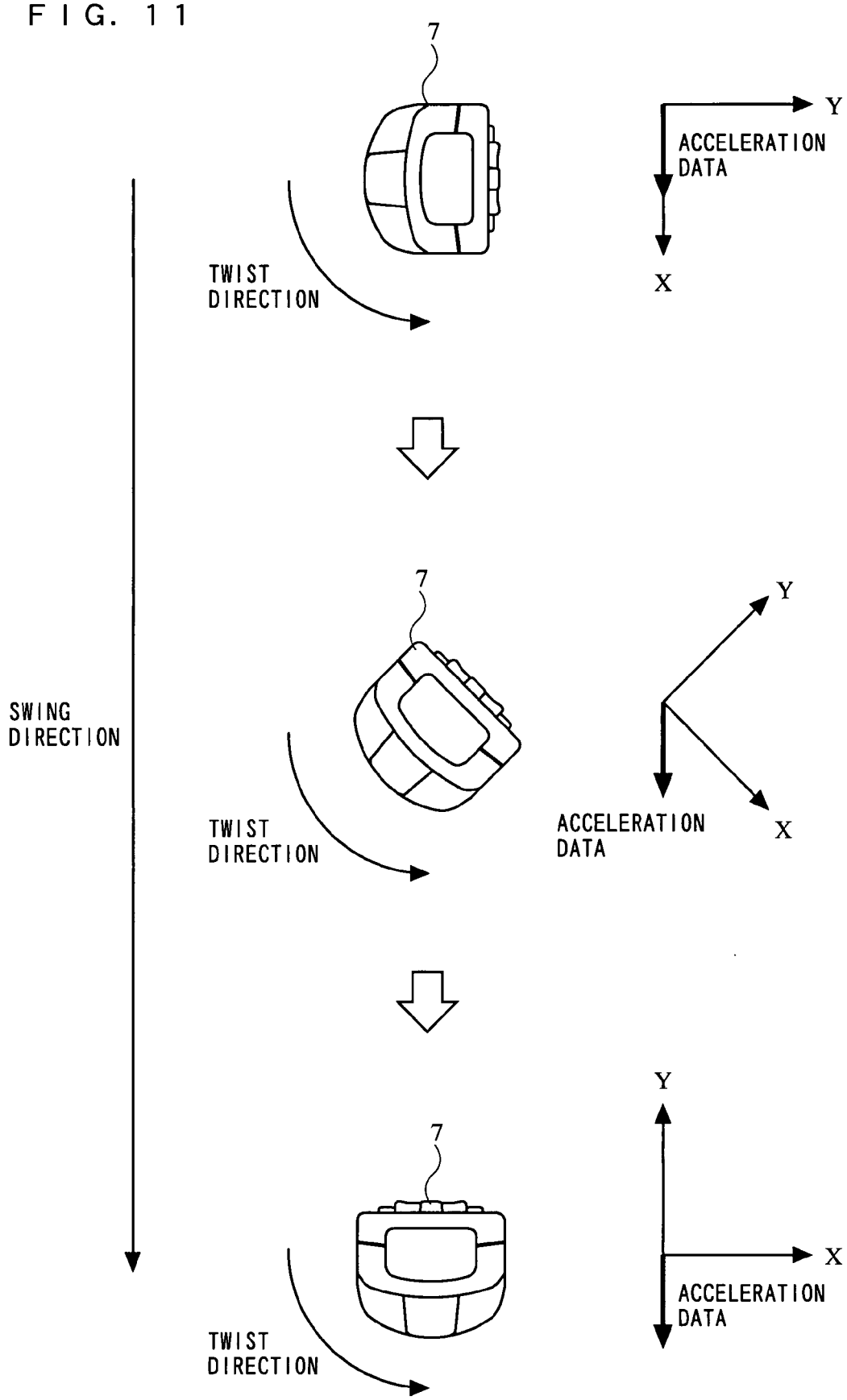
FIG. 11 shows the controller 7 being swung down from the reference position by the right hand of the player while being twisted in one direction.
Figure 12:
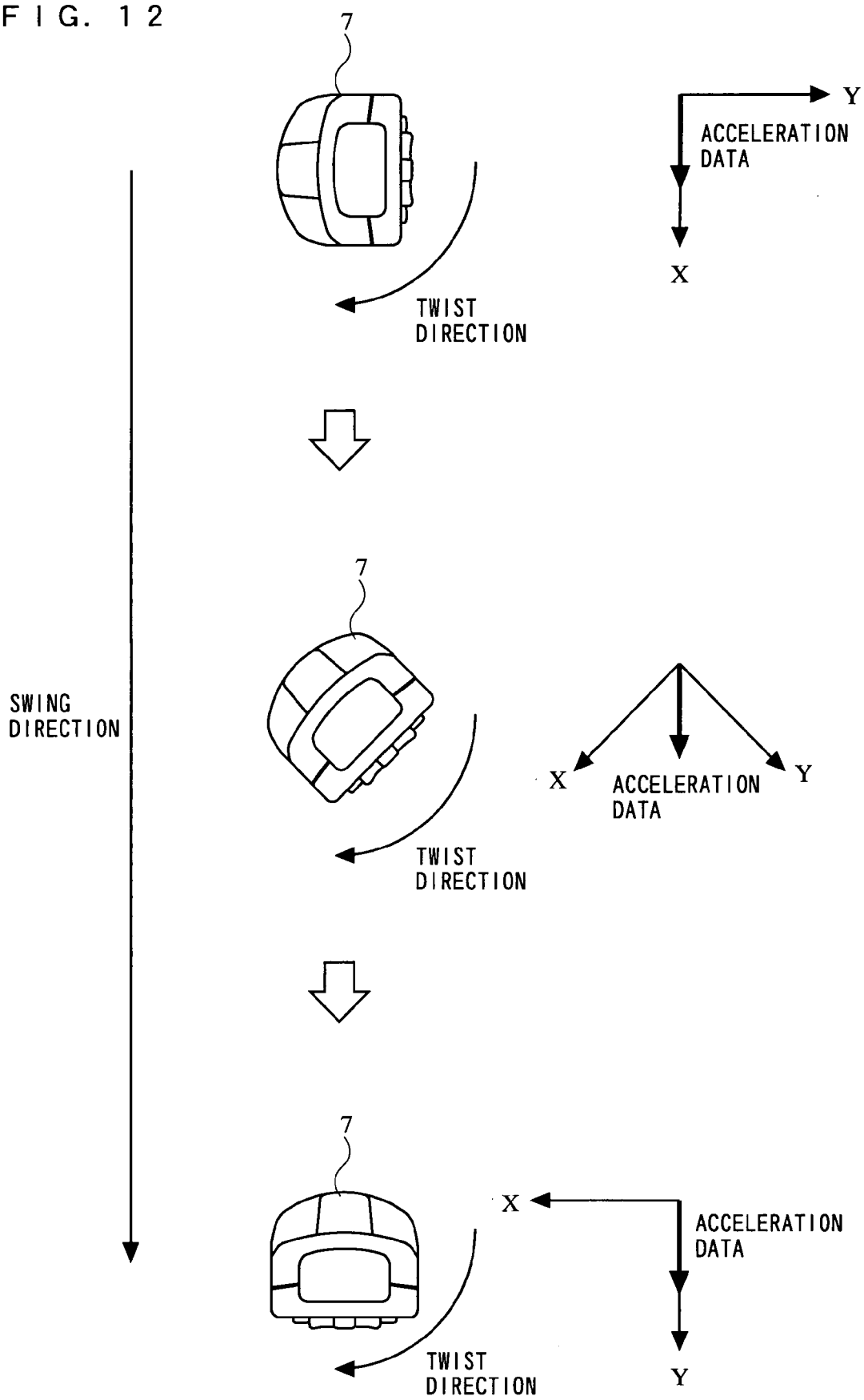
FIG. 12 shows the controller 7 being swung down from the reference position by the right hand of the player while being twisted in the other direction.

Referring now to FIGS. 10 to 12, downward swings of the controller 7 by the player while twisting the controller 7 will be discussed. FIG. 10 shows a downward swing of the controller 7 by the right hand of the player with no twist from the reference position. FIG. 11 shows a downward swing of the controller 7 by the right hand of the player while twisting the controller 7 from the reference position in a first direction. FIG. 12 shows a downward swing of the controller 7 by the right hand of the player while twisting the controller 7 from the reference position in a second direction. Note that it is characteristic of the acceleration sensor 701 that data outputted from the acceleration sensor 701 (hereinafter referred to as the "acceleration data") represents an acceleration in exactly the opposite direction to the acceleration being imparted upon the acceleration sensor 701 (i.e., the direction in which the acceleration sensor 701 is actually being accelerated). In other words, the acceleration sensor 701 outputs acceleration data according to an inertial force caused by the acceleration of the acceleration sensor 701. Note also that the gravitational acceleration being imparted upon the acceleration sensor 701 when the controller 7 is static is outputted as acceleration data in the same direction as the direction of gravity.

In FIGS. 10 to 12, the player holds the controller 7 in the reference position and swings down the controller 7 as in a throwing motion of a pitcher. Specifically, the player swings down the controller 7 in an overhand throw of baseball, and these figures show the front surface of the controller 7 at or after the release of the ball in the overhand throw. In the present embodiment, a detection operation is performed after the downward swing has reached a sufficient speed in order to prevent erroneous detection, whereby the detection operation is performed at or near the release, for example. Although the point in time at which the player considers he/she has virtually released the ball varies between players, the player does not actually release the controller 7, and therefore the post-release movement of the hand is reflected on the controller 7. Accordingly, the twist detecting operation may include a post-release period as necessary. When one holds and swings the controller 7, the controller 7 accelerates in the beginning and then starts decelerating. Therefore, the controller 7 undergoes an acceleration in the same direction as the swing direction in the beginning of the swing, after which the magnitude of the acceleration gradually decreases, and there occurs an acceleration in the opposite direction to the swing direction. FIGS. 10 to 12 show the controller 7 at or after the release, wherein the controller 7 is in a decelerating portion of the downward swing. Therefore, the controller 7 undergoes a backward acceleration (i.e., an acceleration in the opposite direction to the swing direction). Since the acceleration sensor 701 outputs data in exactly the opposite direction to the direction of acceleration, the acceleration sensor 701 herein outputs acceleration data representing an acceleration in the direction of movement (the swing direction), i.e., the X-axis positive direction. Since the controller 7 is being swung down, the acceleration also includes a component of the gravitational acceleration in the downward direction of the figure (the X-axis positive direction in FIG. 10).

In FIG. 10, the player swings down the controller 7 while maintaining the reference position without twisting the controller 7. Specifically, FIG. 10 shows an operation of swinging down the controller 7 while maintaining the reference position as if a right-handed pitcher would throw a fastball. For example, the controller 7 is being swung while constantly facing the X-axis positive direction (see, for example, FIG. 3) as shown in FIG. 10. In such a case, the acceleration caused by the swing of the controller 7 is constantly acting in a direction along the X axis. When the controller 7 is swung, a centrifugal force and a gravitational acceleration act in the Z-axis direction of the controller 7, but the acceleration in the Z-axis direction will be ignored herein for the purpose of simplicity. Specifically, there occurs an acceleration in the X-axis positive direction (the outputted acceleration data represents an acceleration in the X-axis negative direction) when the controller 7 is being accelerated in the beginning of a swing, and there occurs an acceleration in the X-axis negative direction (the outputted acceleration data represents an acceleration in the X-axis positive direction) when the controller 7 is being decelerated toward the end of the swing. Where the player holds the controller 7 in the left hand and swings down the controller 7 as if a left-handed pitcher would throw a fastball, the outputted acceleration data will represent an acceleration in the opposite direction with respect to the X axis of the controller 7.

In FIG. 11, the player swings down the controller 7 while twisting the controller 7 from the reference position as if a right-handed pitcher would throw a curveball. A curveball is a type of pitch where the ball has a right-handed spin, and a right-handed pitcher would throw a curveball by swinging down the controller 7 while giving it a right-handed twist about the Z axis as viewed in the Z-axis positive direction. Note that the twist is seen in FIG. 11 to be left-handed because FIG. 11 shows the front surface of the controller 7 as viewed in the Z-axis negative direction. In this case, the acceleration data outputted as the controller 7 is being swung shifts its direction gradually from the X-axis positive direction to the Y-axis negative direction. Thus, if the player swings down the controller 7 as if a right-handed pitcher would throw a curveball, there occurs an acceleration in the Y-axis positive direction of the controller 7, and acceleration data representing an acceleration in the Y-axis negative direction is outputted from the acceleration sensor 701. If the player holds the controller 7 in the left hand and swings down the controller 7 as if a left-handed pitcher would throw a curveball, the acceleration data shifts its direction gradually from the X-axis negative direction to the Y-axis negative direction. Thus, also in a case where the player swings down the controller 7 as if a left-handed pitcher would throw a curveball, there occurs an acceleration in the Y-axis positive direction of the controller 7, and acceleration data representing an acceleration in the Y-axis negative direction is outputted from the acceleration sensor 701.

In FIG. 12, the player swings down the controller 7 while twisting the controller 7 from the reference position as if a right-handed pitcher would throw a screwball. As opposed to a curveball, a screwball is a type of pitch where the ball has a left-handed spin, and a right-handed pitcher would throw a screwball by swinging down the controller 7 while giving it a left-handed twist about the Z axis as viewed in the Z-axis positive direction. Note that the twist is seen in FIG. 12 to be right-handed because FIG. 12 shows the front surface of the controller 7 as viewed in the Z-axis negative direction. In this case, the acceleration data outputted as the controller 7 is being swung shifts its direction gradually from the X-axis positive direction to the Y-axis positive direction. Thus, if the player swings down the controller 7 as if a right-handed pitcher would throw a screwball, there occurs an acceleration in the Y-axis negative direction of the controller 7, and acceleration data representing an acceleration in Y-axis positive direction is outputted from the acceleration sensor 701. If the player holds the controller 7 in the left hand and swings down the controller 7 as if a left-handed pitcher would throw a screwball, the acceleration data shifts its direction gradually from the X-axis negative direction to the Y-axis positive direction. Thus, also in a case where the player swings down the controller 7 as if a left-handed pitcher would throw a screwball, there occurs an acceleration in the Y-axis negative direction of the controller 7, and acceleration data representing an acceleration in the Y-axis positive direction is outputted from the acceleration sensor 701.

Figure 13:
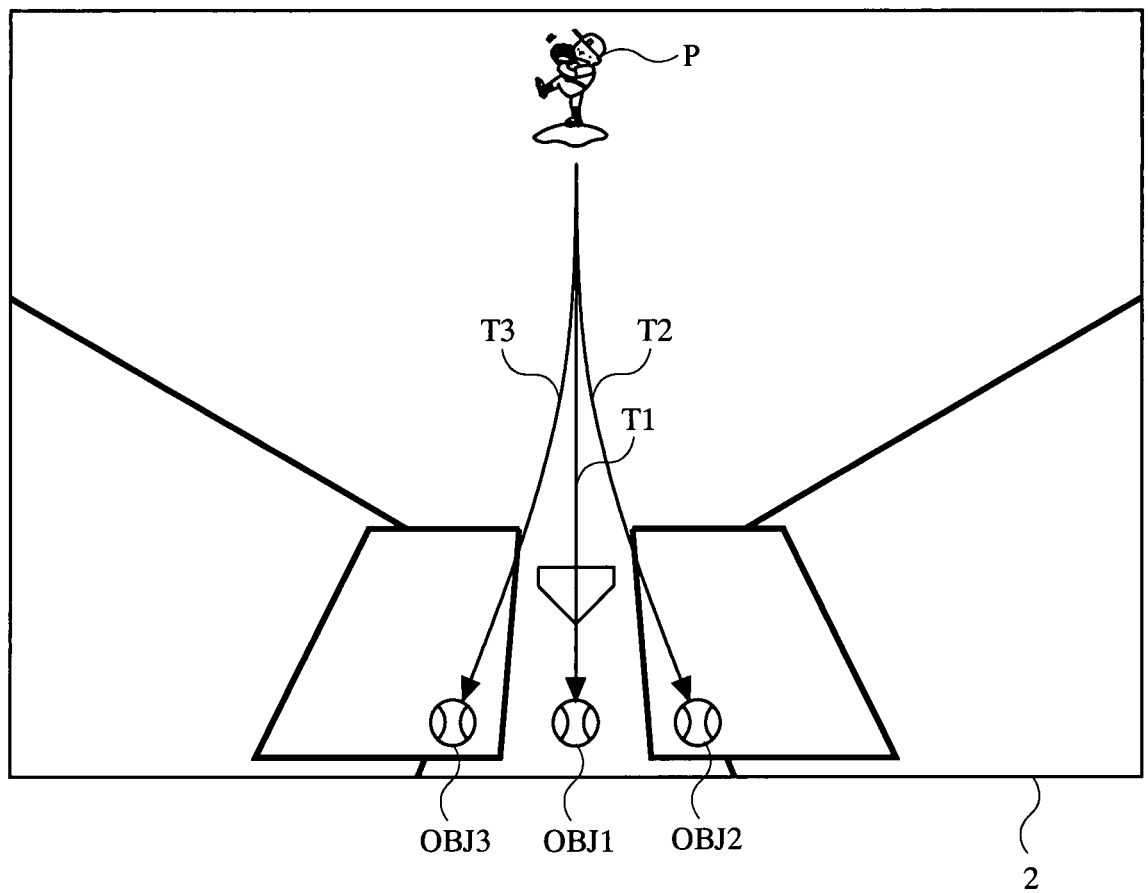
FIG. 13 shows an example of a game process to be performed based on the swing type of the controller 7.

FIG. 13 shows an example of a game process to be performed based on the swing type of the controller 7. As an example of a game process, the movement of an object OBJ displayed on the monitor 2 is controlled based on the twist direction. Specifically, a plurality of change-of-direction types are defined in advance, each representing how the direction of the movement of the object OBJ in the virtual game space changes, and one of the change-of-direction types is selected according to the swing type of the controller 7 determined based on the comparison result between a threshold value and the acceleration data.

For example, FIG. 13 shows a game image as viewed from the catcher side, wherein a right-handed pitcher character P to be present in the virtual game space throws the ball object OBJ. FIG. 13 shows trajectories T1 to T3 of the ball objects OBJ1 to OBJ3, being examples of the trajectory T along which the ball object OBJ travels in the virtual game space based on the selected type of pitch (the change-of-direction type).

For example, when the player swings down the controller 7 as if a right-handed pitcher would throw a fastball (see FIG. 10), a change-of-direction type corresponding to the type of pitch "fastball" is selected. Then, the pitcher character P throws the ball object OBJ1 that moves in the virtual game space in a straight path (the trajectory T1), thus displaying a game image that looks as if the pitcher character P threw a fastball.

When the player swings down the controller 7 as if a right-handed pitcher would throw a curveball (see FIG. 11), a change-of-direction type corresponding to the type of pitch "curveball" is selected. Then, the pitcher character P throws the ball object OBJ2 that moves in the virtual game space in a path curved to the left as viewed from the pitcher character P (the trajectory T2; the path is curved to the right in FIG. 13 because the figure shows the pitch as viewed from the catcher side), thus displaying a game image that looks as if the pitcher character P threw a curveball.

When the player swings down the controller 7 as if a right-handed pitcher would throw a screwball (see FIG. 12), a change-of-direction type corresponding to the type of pitch "screwball" is selected. Then, the pitcher character P throws the ball object OBJ3 that moves in the virtual game space in a path curved to the right as viewed from the pitcher character P (the trajectory T3; the path is curved to the left in FIG. 13 because the figure shows the pitch as viewed from the catcher side), thus displaying a game image that looks as if the pitcher character P threw a screwball.

Thus, the player operating the controller 7 can throw a breaking ball in the virtual game space based on the direction in which the player twists the controller 7 while swinging down the controller 7. While the above description has been directed primarily to cases of a right-handed pitcher, i.e., where the player holds the controller 7 in the right hand, the process is substantially the same with cases of a left-handed pitcher. For example, with a left-handed pitcher, i.e., in cases where the player holds the controller 7 in the left hand, a left-handed pitcher character P is introduced to the virtual game space through a game initialization process, or the like. Then, when a change-of-direction type corresponding to the type of pitch "curveball" is selected, a ball object OBJ is displayed that curves to the right as viewed from the pitcher character P in the virtual game space. When a change-of-direction type corresponding to the type of pitch "screwball" is selected, a ball object OBJ is displayed that curves to the left as viewed from the pitcher character P in the virtual game space. Thus, in cases of a left-handed pitcher, a game process as described above for cases of a right-handed pitcher can be used only by reversing the direction in which the object OBJ curves depending on the selected type of pitch.

The details of the game process performed by the game system 1 will now be described. First, referring to FIG. 14, important data to be used in the game process will be described. FIG. 14 shows important data to be stored in the external main memory 12 and/or the internal main memory 35 of the game device main unit 5 (hereinafter, the two main memories will be referred to collectively as the "main memory").

Referring to FIG. 14, the main memory stores acceleration data Da, key data Db, acceleration vector size data Dc, accumulated acceleration data Dd, average acceleration data De, type of pitch data Df, difference vector data Dg, maximum difference vector size data Dh, a ball speed definition table Di, ball speed data Dj, a shooting direction definition table Dk, shooting direction data Dl, location data Dm, ball spin amount data Dn, movement vector data Do, image data Dp, etc. In addition to those shown in FIG. 14, the main memory also stores other data necessary for the game process, such as data regarding other objects to be in the game, and data regarding the virtual game space (e.g., background image data).

The acceleration data Da is data representing an acceleration acc imparted upon the controller 7, and acceleration data included in a series of control information, transmitted from the controller 7 as transmit data, are stored over a predetermined period of time. The acceleration data Da includes X-axis direction acceleration data Da1 (representing the acceleration accX detected by the acceleration sensor 701 for the X-axis component), Y-axis direction acceleration data Da2 (representing the acceleration accY detected for the Y-axis component), and Z-axis direction acceleration data Da3 (representing the acceleration accZ detected for the Z-axis component). As described above, the acceleration data outputted from the acceleration sensor 701 represents vector data of the opposite direction to the actual acceleration imparted upon the acceleration sensor 701 during the downward swing, and this similarly applies to the acceleration data stored in the acceleration data Da. Thus, the accelerations accX, accY and accZ are values of the opposite sign to those actually imparted upon the controller 7 during the downward swing. The key data Db is data represented by the operation signal according to an operation on the control section 72, and stores key data included in the series of control information transmitted from the controller 7 as transmit data.

The wireless controller module 19 provided in the game device main unit 5 receives the acceleration data and the key data included in the control information transmitted from the controller 7 at a predetermined cycle (e.g., every 1/200 second), and the received data are stored in a buffer (not shown) provided in the wireless controller module 19. Then, the latest acceleration data and key data stored in the buffer are read out every frame (e.g., every 1/60 second), which is the game process cycle, to update the acceleration data Da and the key data Db in the main memory. In the present embodiment, the acceleration data Da stores updated acceleration data for a predetermined number of frames transmitted from the controller 7.

In the process flow to be described later, the acceleration data Da and the key data Db are updated every frame, being the game process cycle. However, the update frequency is not limited to this. For example, the acceleration data Da and the key data Db may be updated in synchronism with the cycle with which data are transmitted from the controller 7, and the updated acceleration data and key data may be used for every game process cycle. In such a case, the cycle of updating the acceleration data Da1 to Da3 and the key data Db stored in the acceleration data Da will be different from the game process cycle.

The acceleration vector size data Dc is data representing the magnitude s of the acceleration acting upon the controller 7, and is calculated based on the latest X-axis, Y-axis and Z-axis direction acceleration data Da1, Da2 and Da3. The accumulated acceleration data Dd is data representing the total value Ytotal obtained by accumulating the Y-axis direction acceleration accY over a predetermined process cycles. The average acceleration data De is data representing the average value avgY of the Y-axis direction acceleration accY, which is calculated based on the value stored in the accumulated acceleration data Dd.

The type of pitch data Df is data representing the type of pitch selected according to the movement of the controller 7. In the present embodiment, the type of pitch data Df is selected based on the average value avgY from among fastball, curveball and screwball.

The difference vector data Dg is data representing a difference vector representing the change in the X-axis direction acceleration accX and the Y-axis direction acceleration accY. The maximum difference vector size data Dh is data representing the magnitude Lmax of the largest difference vector among all the difference vectors calculated within a predetermined period of time. The ball speed definition table Di is a data table defining predetermined ball speed levels of the ball thrown by the pitcher character P with respect to the magnitude Lmax. The details of the data table stored in the ball speed definition table Di will be described later. The ball speed data Dj is data representing the ball speed determined based on the ball speed level.

The shooting direction definition table Dk is a data table defining a predetermined shooting direction D in which the pitcher character P throws a ball for each combination of the selected type of pitch and the selected location of pitch. The details of the data table stored in the shooting direction definition table Dk will be described later. The shooting direction data Dl is data representing the shooting direction D, which is selected based on the combination of the type of pitch and the location of pitch with reference to the shooting direction definition table. The location data Dm is data representing the pitch location (e.g., inside, middle, or outside), which is determined by the player pressing the cross-shaped key 72*i*.

The ball spin amount data Dn is data representing the spin amount (spin direction) of the ball when thrown in the virtual game space, and is set according to the selected type of pitch. The movement vector data Do is data representing the movement vector of the ball when thrown in the virtual game space, and is calculated based on the previous movement vector, the ball speed and the spin amount.

The image data Dp includes ball object image data Dp1, pitcher character image data Dp2, etc. The ball object image data Dp1 is data used for placing the ball object OBJ in the virtual game space to thereby produce a game image. The pitcher character image data Dp2 is data used for placing the pitcher character P in the virtual game space to thereby produce a game image.

Figure 15:
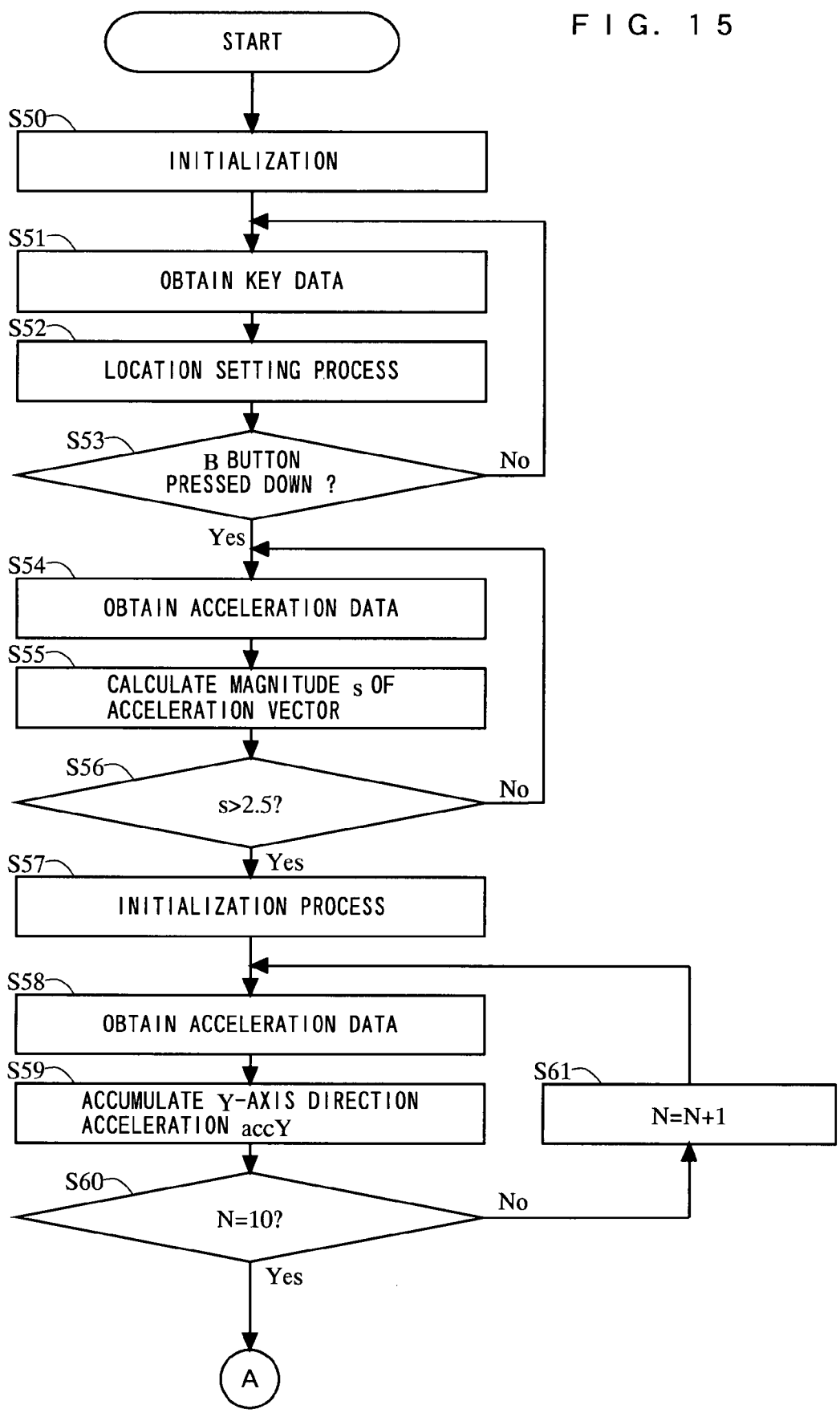
FIG. 15 is a first half of a flow chart showing a game process to be performed by the game device main unit 5 of FIG. 2.
Figure 16:
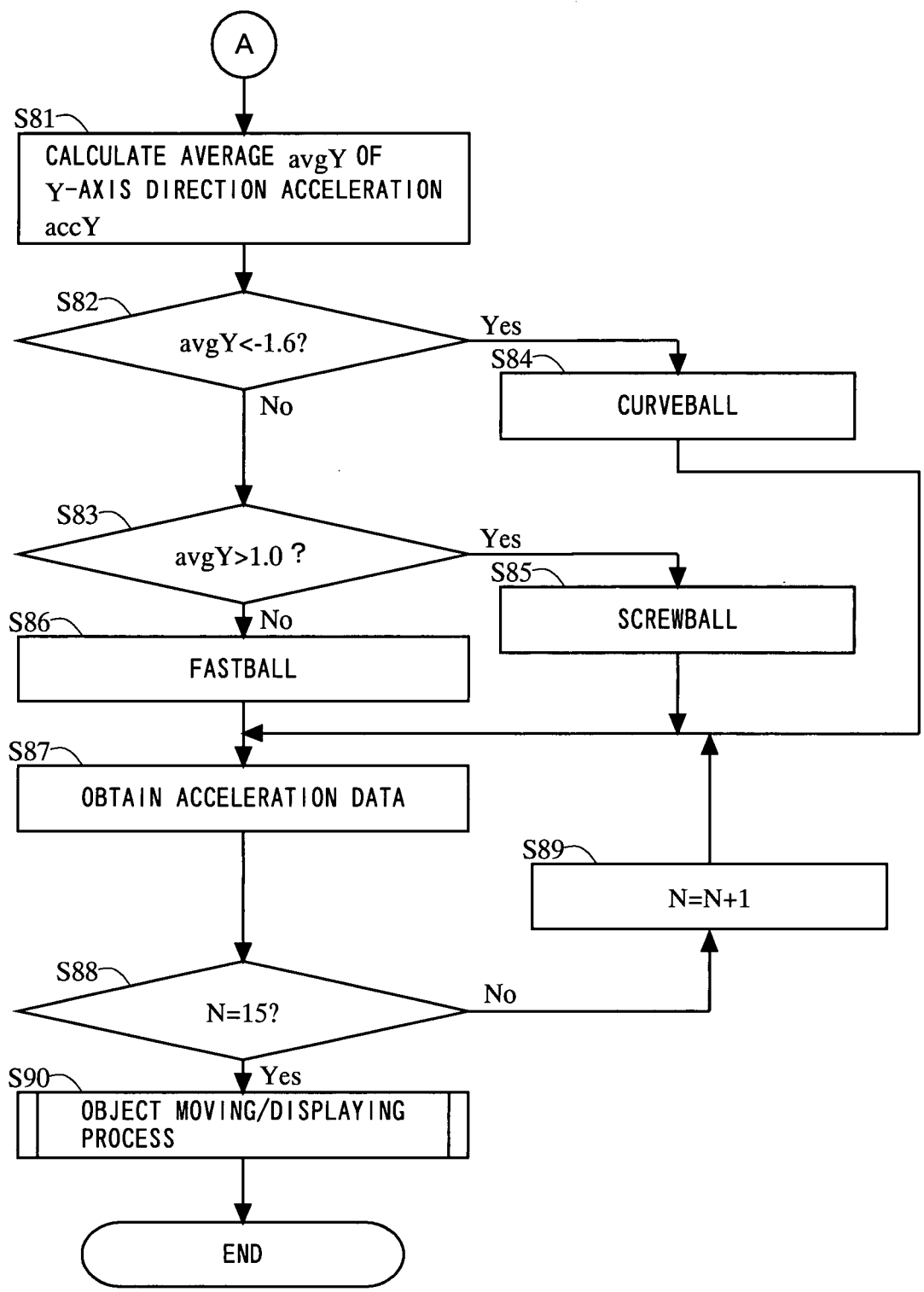
FIG. 16 is a latter half of the flow chart showing a game process to be performed by the game device main unit 5 of FIG. 2.
Figure 17:
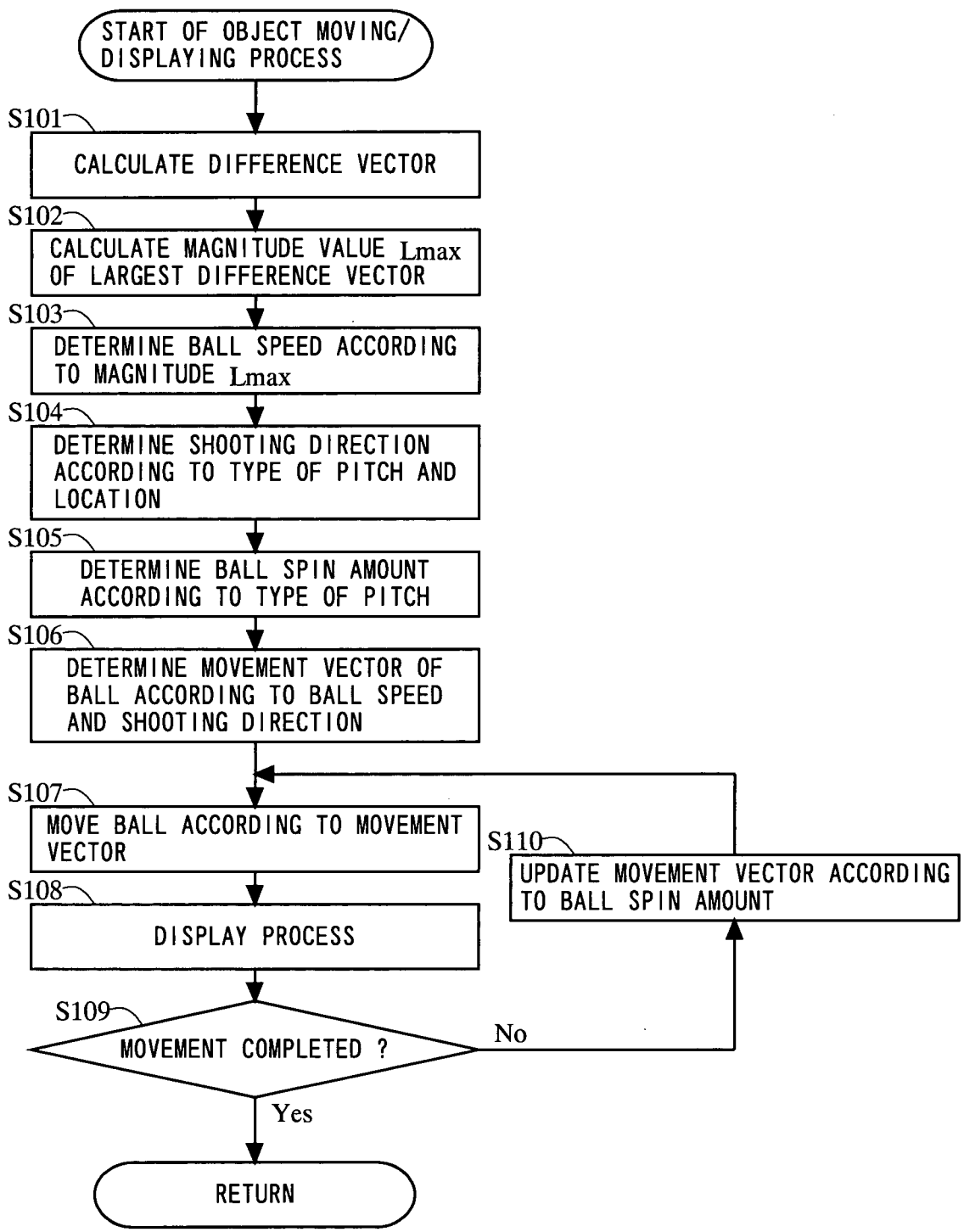
FIG. 17 shows, in detail, a subroutine of step 91 in FIG. 16 for the object moving/displaying process.

Referring now to FIGS. 15 to 17, the details of the game process performed by the game device main unit 5 will now be described. FIG. 15 is a first half of a flow chart showing a game process to be performed by the game device main unit 5. FIG. 16 is a latter half of the flow chart showing a game process to be performed by the game device main unit 5. FIG. 17 shows, in detail, a subroutine of step 91 in FIG. 16 for the object moving/displaying process. In the flow charts shown in FIGS. 15 to 17, parts of the game process for throwing a pitch according to a downward swing of the controller 7 are described, and other parts of the game process that are not directly related to the present invention are not described in detail. In FIGS. 15 to 17, each step performed by the CPU 10 is denoted by an abbreviation "S" plus the step number.

When the power of the game device main unit 5 is turned ON, the CPU 10 of the game device main unit 5 executes a boot program stored in a boot ROM (e.g., the ROM/RTC 13), thus initializing various units such as the main memory. The game program stored in the optical disc 4 is loaded to the main memory, and the CPU 10 starts executing the game program. The flow charts of FIGS. 15 to 17 show the game process performed after the completion of the process described above.

Referring to FIG. 15, the CPU 10 performs the game initialization process (step 50), and the process proceeds to the next step. For example, in the initialization process in step 50, the CPU 10 initializes various parameters to be used in the game process. The CPU 10 determines whether the player holds the controller 7 in the right hand or the left hand, and determines the pitcher character P to be a right-handed pitcher or a left-handed pitcher accordingly. Moreover, the CPU 10 defines the virtual game space, and performs other initializations such as placing various game objects, e.g., the pitcher character P.

Then, the CPU 10 obtains the key data (step 51). Then, the CPU 10 performs the location setting process using the obtained key data (step 52), and the process proceeds to the next step. For example, when the key data obtained by the CPU 10 indicates that the player has pressed the up or down key of the cross-shaped key (the control button 72*a*), the location data Dm is updated while setting the pitch location to "middle". When the key data obtained by the CPU 10 indicates that the player has pressed the left key of the cross-shaped key, the location data Dm is updated while setting the pitch location to "inside". When the key data obtained by the CPU 10 indicates that the player has pressed the right key of the cross-shaped key, the location data Dm is updated while setting the pitch location to "outside". The expressions "inside" and "outside" are used herein with respect to a game image displayed on the monitor 2 as viewed from the catcher side (see FIG. 13) with a right-handed batter being in position.

Then, the CPU 10 uses the obtained key data to determine whether the B button (the control button 72*i*) of the controller 7 has been pressed (step 53). If it is determined by the CPU 10 that the B button has been pressed, the process proceeds step 54. If it is determined by the CPU 10 that the B button has not been pressed, the process returns step 51 to repeat the process.

In step 54, the CPU 10 obtains the acceleration data from the controller 7, and the process proceeds to the next step. For example, the CPU 10 stores, in the acceleration data Da, the acceleration represented by the acceleration data included in the latest control information received from the controller 7. Specifically, the acceleration data in the X-axis direction included in the control information received from the controller 7 is stored in the X-axis direction acceleration data Da1 as the acceleration accX. Moreover, the acceleration data in the Y-axis direction included in the latest control information is stored in the Y-axis direction acceleration data Da2 as the acceleration accY. Moreover, the acceleration data in the Z-axis direction included in the latest control information is stored in the Z-axis direction acceleration data Da3 as the acceleration accZ.

Then, the CPU 10 refers to the latest acceleration data stored in the acceleration data Da to calculate the magnitude s of the acceleration vector (step 55), and determines whether the magnitudes is greater than the threshold value (e.g., 2.5 G) (step 56). If it is determined by the CPU 10 that the magnitude s is greater than the threshold value, the process proceeds to step 57. If it is determined by the CPU 10 that the magnitude s is less than or equal to the threshold value, the process returns to step 54 to repeat the process. Specifically, in step 55, the CPU 10 uses the following expression to calculate the magnitude s of the acceleration vector by using the accelerations accX, accY and accZ stored in the acceleration data Da.

$$s = \sqrt{accX^2 + accY^2 + accZ^2}$$

Then, the CPU 10 updates the acceleration vector size data Dc by using the calculated magnitude s.

The process of steps 55 and 56 is a process for detecting whether the player's downward swing of the controller 7 while pressing down the B button (the control button 72i) has reached a sufficient speed, and the subsequent process is initiated when the magnitude of the acceleration imparted upon the controller 7 exceeds a threshold value. In this example, the downward swing determination is made based on the magnitude of the acceleration of the controller 7 in three axial directions (the X-, Y- and Z-axis directions). Alternatively, the determination can be made based on the magnitude of any other suitable acceleration. For example, since it is assumed that the centrifugal force component produced by swinging down the controller 7 is detected primarily as being a Z-axis positive direction component (the centrifugal force component is outputted as acceleration data of the same direction as the direction in which the centrifugal force is acting), the downward swing determination can be made based on whether the magnitude of the latest acceleration accZ stored in the Z-axis direction acceleration data Da3 is greater than a threshold value (e.g., 1.2 G).

Moreover, the swing operation determination is performed only if the B button of the controller 7 is being held down by the player. A first purpose of this is to prevent an erroneous determination, which may occur when the player inadvertently swings the controller 7 without intending to perform the pitch throwing operation. A second purpose is to force the player to naturally hold the controller 7 in the reference position described above by requiring the player to hold down the B button with, for example, the index finger or the middle finger when performing the pitch throwing operation. Thus, it is possible to force the player to hold the controller 7 in the reference position. In this position, the player can get a feel close to that of holding a ball in hand. However, the button operation determination may not be performed in other embodiments.

In step 57, the CPU 10 performs the initialization process, and the process proceeds to the next step. Specifically, the CPU 10 reserves a buffer in the main memory (e.g., in the acceleration data Da) for storing X- and Y-axis direction acceleration data over a predetermined number of process cycles (e.g., 15 cycles). The CPU 10 initializes the loop counter N for counting the number of cycles to 1. Moreover, the CPU 10 initializes the total value Ytotal and updates the accumulated acceleration data Dd.

Then, the CPU 10 obtains the acceleration data from the controller 7 (step 58), and the process proceeds to the next step. For example, the CPU 10 stores, in the acceleration data Da, the acceleration represented by the acceleration data included in the latest control information received from the controller 7. The acceleration data Da stores the acceleration data over the predetermined number of process cycles, at least for the X-axis direction acceleration data Da1 and the Y-axis direction acceleration data Da2. The process of obtaining the acceleration data in step 58 is similar to step 54, and thus will not be further described below.

Then, the CPU 10 calculates the total value Ytotal obtained by successively accumulating the latest Y-axis direction acceleration accY obtained in step 58 to update the accumulated acceleration data Dd (step 59), and the process proceeds to the next step. For example, the CPU 10 calculates the total value Ytotal_new by using the total value Ytotal_old, which is calculated in the previous process cycle, as shown in the following expression.

$$Ytotal\_new = Ytotal\_old + accY$$

Then, the CPU 10 determines whether the current value of the loop counter N is 10 (step 60). If it is determined by the CPU 10 that N=10, the process proceeds to step 81 (see FIG. 16). If it is determined by the CPU 10 that N<10, the loop counter N is incremented by 1 (step 61), and the process returns to step 58 to repeat the process.

In step 81 (FIG. 16), the CPU 10 calculates the average value avgY of the Y-axis direction acceleration accY by using the total value Ytotal stored in the accumulated acceleration data Dd, and the process proceeds to the next step. Specifically, the CPU 10 calculates the average value avgY as shown in the following expression, $$avgY = Ytotal/N$$

and updates the average acceleration data De.

Then, the CPU 10 determines whether the average value avgY calculated in step 81 is less than a first determination value (e.g., −1.6 G) (step 82) and determines whether the average value avgY is greater than a second determination value (e.g., 1.0 G) (step 83). If it is determined by the CPU 10 that the average value avgY is less than the first determination value, the type of pitch data Df is updated while setting the type of pitch to "curveball" (step 84), and the process proceeds to step 87. If it is determined by the CPU 10 that the average value avgY is greater than the second determination value, the type of pitch data Df is updated while setting the type of pitch to "screwball" (step 85), and the process proceeds to step 87. If it is determined by the CPU 10 that the average value avgY is greater than or equal to the first determination value and less than or equal to the second determination value, the type of pitch data Df is updated while setting the type of pitch to "fastball" (step 86), and the process proceeds to step 87.

The method for determining the type of pitch in the process of steps 81 to 86 will now be described. First, the average value avgY calculated in step 81 is the average value of the Y-axis direction acceleration accY over a predetermined period of time (e.g., 10 frames) during the operation of swinging down the controller 7. The predetermined period of time is a period after the swing speed of the player holding and swinging the controller 7 exceeds a predetermined speed. For example, if the predetermined period of time is the entire period from the start of the player's pitch-throwing motion to the end of the downward swing operation, factors other than the twist to be actually imparted upon the ball for throwing a breaking ball (e.g., a twist given in the follow-through of the pitch-throwing motion) may be erroneously incorporated. In contrast, the predetermined period of time of the present embodiment is set to be a period suitable for determining the twist to be actually imparted upon the ball for throwing a ball, e.g., starting from a point in time when it is determined that the swing has reached a sufficient speed after the start of the downward swing operation until an ending point in time such as the release of the ball (some post-release period may also be included). Thus, the average value avgY is the average value of the Y-axis direction acceleration accY occurring over a period of time that is suitable for determining the twist to be imparted upon the ball for throwing a ball.

In the present embodiment, one swing type, representing a particular type of a twist of the controller 7 during the swing thereof, is selected based on the average value of the acceleration in the predetermined axial direction (the Y-axis direction acceleration accY) from among a plurality of swing types (i.e., a swing with no twist, a swing with a twist in the first direction, and a swing with a twist in the second direction). Based on the selected swing type, one change-of-direction type is selected from among a plurality of change-of-direction types (i.e., fastball, curveball and screwball) each representing a particular type of change in the direction in which the object OBJ moves in the virtual game space.

For example, as described above with reference to FIG. 10, when the player swings down the controller 7 with the right hand as if the player would throw a fastball, the movement of the controller 7 primarily outputs acceleration data in the X-axis positive direction. Specifically, when the player throws a fastball, the Y-axis direction acceleration accY stays near 0. Therefore, when the average value of the Y-axis direction acceleration accY is near 0, i.e., when $-1.6$ G (the first determination value)$\leq$avgY$\leq$1.0 G (the second determination value), the type of swing of the controller 7 can be determined to be the type where the controller 7 is swung with no particular twist. In response to the determination of the swing type of the controller 7, the type of pitch is set to "fastball".

Moreover, when the player swings down the controller 7 with the right hand as if the player would throw a curveball, as described above with reference to FIG. 11, the acceleration data outputted according to the movement of the controller 7 shifts from the X-axis positive direction to the Y-axis negative direction. Specifically, when the player throws a curveball, the Y-axis direction acceleration accY shifts to a negative value. Therefore, when the average value of the Y-axis direction acceleration accY is negative, i.e., when the average value avgY$<-1.6$ G (the first determination value), the type of swing of the controller 7 can be determined to be the type where the controller 7 is swung with a twist in the first direction. In response to the determination of the swing type of the controller 7, the type of pitch is set to "curveball".

Moreover, when the player swings down the controller 7 with the right hand as if the player would throw a screwball, as described above with reference to FIG. 12, the acceleration data outputted according to the movement of the controller 7 shifts from X-axis positive direction to the Y-axis positive direction. Specifically, when the player throws a screwball, the Y-axis direction acceleration accY shifts to a positive value. Therefore, when the average value of the Y-axis direction acceleration accY is positive, i.e., when the average value avgY$>1.0$ G (the second determination value), the type of swing of the controller 7 can be determined to be the type where the controller 7 is swung with a twist in the second direction. In response to the determination of the swing type of the controller 7, the type of pitch is set to "screwball".

The above-described principle of determining the type of pitch assumed a right-handed pitcher, the determination of the type of pitch can be made with substantially the same determination threshold for a left-handed pitcher. When the player swings down the controller 7 with the left hand as if the player would throw a fastball, as described above, the movement of the controller 7 primarily outputs acceleration data in the X-axis negative direction. Specifically, also when the player throws a fastball with the left hand, the Y-axis direction acceleration accY stays near 0. Therefore, it is possible to use the same determination method as that for a right-handed pitcher to determine the swing type of the controller 7 and set the type of pitch to "fastball". When the player swings down the controller 7 with the left hand as if the player would throw a curveball, the acceleration data outputted according to the movement of the controller 7 shifts from the X-axis negative direction to the Y-axis negative direction. Specifically, also when the player throws a curveball with the left hand, the Y-axis direction acceleration accY shifts to a negative value. Therefore, it is possible to use the same determination method as that for a right-handed pitcher to determine the swing type of the controller 7 and set the type of pitch to "curveball". Similarly, when the player swings down the controller 7 with the left hand as if the player would throw a screwball, the acceleration data outputted according to the movement of the controller 7 shifts from the X-axis negative direction to the Y-axis positive direction. Specifically, also when the player throws a screwball with the left hand, the Y-axis direction acceleration accY shifts to a positive value. Therefore, it is possible to used the same determination method as that for a right-handed pitcher to determine the swing type of the controller 7 and set the type of pitch to "screwball".

The first determination value and the second determination value are preferably determined in consideration of the natural movement of a human arm swinging down the controller 7 while twisting the controller 7. It is typically easier to execute the twist of the arm for throwing a curveball than to execute the reverse twist of the arm for throwing a screwball. Thus, if the same determination threshold or close determination thresholds are used for a screwball and for a curveball, the determination results will be unbalanced. In view of this, in the present embodiment, the difference (e.g., 1.0 G) between the reference value and the second determination value is set to be smaller than the difference (e.g., 1.G) between the reference value (avgY=0) and the first determination value so that a pitch is more easily determined to be a screwball than to be a curveball. Thus, by setting the determination level for each type of breaking ball, the determination results will be closer to those intended by the player.

While the swing type of the controller 7 is selected based on the average value avgY of the Y-axis direction acceleration accY in the above description, the swing type may be selected based on any other suitable parameter. For example, it is understood that the swing type can be determined as described above by setting the first determination value and the second determination value based on the total value Ytotal as it is.

Referring back to FIG. 16, in step 87, the CPU 10 obtains the acceleration data from the controller 7, and the process proceeds to the next step. The process of obtaining the acceleration data in step 87 is similar to step 58, and thus will not be further described below.

Then, the CPU 10 determines whether the current value of the loop counter N is 15 (step 88). If it is determined by the CPU 10 that N=15, the process proceeds to step 90. If it is determined by the CPU 10 that N<15, the loop counter N is incremented by 1 (step 89), and the process returns to step 87 to repeat the process. Thus, the acceleration data are stored in the buffer until the loop counter N is equal to 15.

In step 90, the CPU 10 performs the object moving/displaying process, and exits the process of the flow chart. The details of the object moving/displaying process will now be described with reference to FIG. 17.

Referring to FIG. 17, the CPU 10 calculates the difference vector for each set of the X-axis direction acceleration data Da1 and the Y-axis direction acceleration data Da2 over a predetermined number of process cycles (herein 15 frames) stored in the acceleration data Da and stores the calculated difference vector in the difference vector data Dg (step 101), and the process proceeds to the next step. For example, assume that the X-axis direction acceleration and Y-axis direction acceleration obtained in one cycle are accX0 and accY0, respectively, and those obtained in the previous cycle are accXb and accYb, respectively. Then, the difference vector is (accX0−accXb, accY0−accYb). Such a difference vector is calculated in each of the predetermined number of process cycles.

Then, the CPU 10 calculates the magnitude Lmax of the maximum difference vector among all the difference vectors calculated in step 101 and stores the magnitude Lmax in the maximum difference vector size data Dh (step 102), and the process proceeds to the next step. For example, the magnitude L of each difference vector calculated instep 101 is calculated as follows.

$$L=\sqrt{(accX0-accXb)^2+(accY0-accYb)^2}$$

Then, the maximum value among the magnitude values L is determined to be Lmax.

Then, the CPU 10 determines a ball speed level according to the magnitude Lmax calculated in step 102 (step 103), and the process proceeds to the next step. For example, the CPU 10 determines the ball speed level using the data table stored in the ball speed definition table Di, and stores the ball speed represented by the ball speed level in the ball speed data Dj. Referring now to FIG. 18, an example of the ball speed definition table will be described.

Referring to FIG. 18, the ball speed definition table defines ball speed levels "0" to "4" each corresponding to a range of the magnitude Lmax. The higher the ball speed level is, the higher the ball speed is. The initial speed of the ball object OBJ to be thrown in the virtual game space is determined based on the ball speed level. The table defines that the ball speed level is "0" for the magnitude Lmax being greater than or equal to 0.0 and less than 2.3. The table defines that the ball speed level is "1" for the magnitude Lmax being greater than or equal to 2.3 and less than 3.0. The table defines that ball speed level is "2" for the magnitude Lmax being greater than or equal to 3.0 and less than 3.7. The table defines that the ball speed level is "3" for the magnitude Lmax being greater than or equal to 3.7 and less than 4.0. The table defines that the ball speed level is "4" for the magnitude Lmax being greater than or equal to 4.0.

Figure 20:
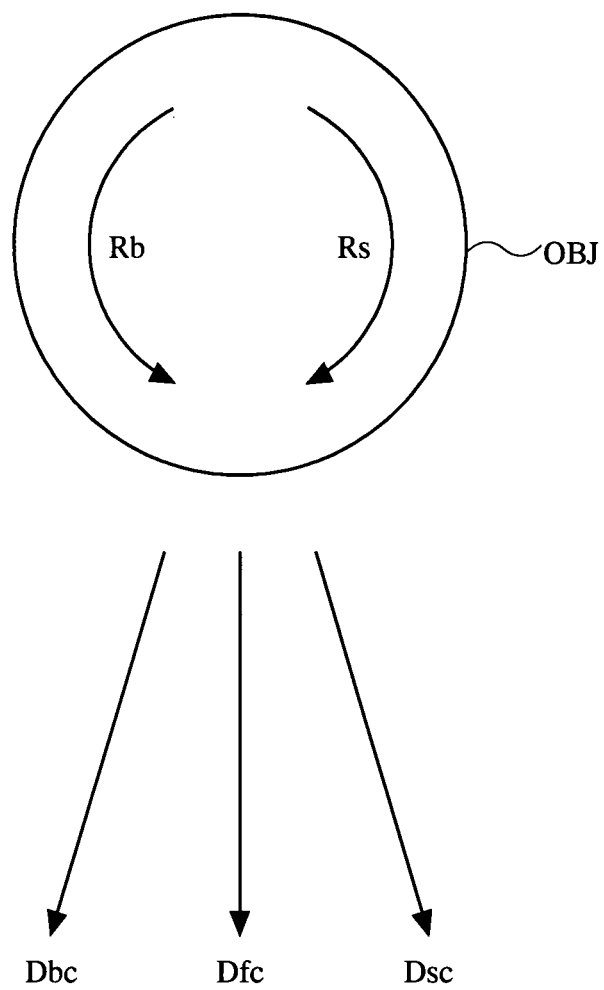
FIG. 20 shows a shooting direction D and a ball spin amount R set in a ball object OBJ.

Referring back to FIG. 17, after the ball speed level is determined in step 103, the CPU 10 determines the shooting direction D of the ball based on the type of pitch and the location (step 104), and the process proceeds to the next step. For example, the CPU 10 determines the shooting direction D using the data table stored in the shooting direction definition table Dk, and stores the shooting direction D in the shooting direction data Dl. Referring now to FIGS. 19 and 20, an example of the shooting direction definition table will be described.

Referring to FIG. 19, the shooting direction definition table defines a shooting direction D for each combination of the type of pitch and the location. The shooting direction D is vector data representing the initial direction in which the pitcher character P throws a ball in the virtual game space. For example, where the location is "inside", shooting directions Dfi, Dbi and Dsi are defined for types of pitch "fastball", "curveball" and "screwball", respectively. Where the location is "middle", shooting directions Dfc, Dbc and Dsc are defined for types of pitch "fastball", "curveball"and "screwball", respectively. Similarly, where the location is "outside", shooting directions Dfo, Dbo and Dso are defined for types of pitch "fastball", "curveball" and "screwball", respectively.

The shooting direction definition table shows that the shooting direction D may differ depending on the type of pitch even if the location is the same. The shooting direction definition table is such that the ball eventually reaches the same location (in front of the batter in the virtual game space), irrespective of the type of pitch. For example, FIG. 20 shows the shooting directions Dfc, Dbc and Dsc of the ball object OBJ for the location "middle", as viewed from above in the virtual game space. Consider the shooting directions Dbc and Dsc with respect to the shooting direction Dfc for the type of pitch "fastball" and the location "middle". For example, when a "curveball" is thrown, the thrown ball object OBJ curves in a curveball path (curves to the right in FIG. 20). In order for a "curveball" to reach the location "middle", the shooting direction Dbc needs to be defined in consideration of the curving of the ball object OBJ. Thus, with respect to the shooting direction Dfc, the shooting direction Dbc has an angle in the direction (to the left in FIG. 20) opposite to the direction in which the ball object OBJ curves. Similarly, when a "screwball" is thrown, the thrown ball object OBJ curves in a screwball path (curves to the left in FIG. 20). In order for a "screwball" to reach the location "middle", the shooting direction Dsc needs to be defined in consideration of the curving of the ball object OBJ. Thus, with respect to the shooting direction Dfc, the shooting direction Dsc has an angle in the direction (to the right in FIG. 20) opposite to the direction in which the ball object OBJ curves.

The shooting directions D for a "curveball" and a "screwball" when the pitcher character P is a right-handed pitcher are opposite to those when the pitcher character P is a left-handed pitcher. Therefore, the shooting direction definition table Dk stores a shooting direction definition table for a right-handed pitcher and another one for a left-handed pitcher. Then, one of the shooting direction definition tables for a right-handed pitcher and a left-handed pitcher is selectively used based on the settings from the initialization in step 50.

Referring back to FIG. 17, after the shooting direction D is determined in step 104, the CPU 10 determines a ball spin amount according to the type of pitch, and stores the determined ball spin amount in the ball spin amount data Dm (step 105), and the process proceeds to the next step. For example, the CPU 10 selects a predetermined ball spin direction and a predetermined spin amount according to the type of pitch set in the type of pitch data Df. Specifically, when a right-handed pitcher throws a "curveball", the ball spin amount is determined so that the ball object OBJ has a left-handed spin of a predetermined spin speed as viewed from above in the virtual game space (a ball spin amount Rb) as shown in FIG. 20. When a right-handed pitcher throws a "screwball", the ball spin amount is determined so that the ball object OBJ has a right-handed spin of a predetermined spin speed as viewed from above in the virtual game space (a ball spin amount Rs). When the type of pitch is "fastball", the ball spin amount is determined so that the ball object OBJ travels with no spin or a vertical spin of a predetermined spin speed. The ball spin speed may be a constant value, or may be varied depending on the average value avgY and the magnitude Lmax.

The ball spin directions for a "curveball" and "screwball" for a left-handed pitcher are opposite to those for a right-handed pitcher. Thus, when a left-handed pitcher throws a "curveball", the ball spin amount is determined so that the ball object OBJ has a right-handed spin of a predetermined spin speed as viewed from above in the virtual game space. When a left-handed pitcher throws a "screwball", the ball spin amount is determined so that the ball object OBJ has a left-handed spin of a predetermined spin speed as viewed from above in the virtual game space.

Then, the CPU 10 determines the movement vector of the ball object OBJ according to the ball speed and the shooting direction, and stores the movement vector data Dn (step 106), and the process proceeds to the next step. For example, the CPU 10 sets the direction of the movement vector to be the shooting direction D stored in the shooting direction data Dk, and the magnitude of the movement vector to be the magnitude represented by the ball speed stored in the ball speed data Di.

Then, the CPU 10 moves the ball object OBJ in the virtual game space according to the movement vector stored in the movement vector data Dn so that it looks as if the pitcher character P threw the ball object OBJ (step 108). Then, the CPU 10 performs a display control process of displaying a game image on the monitor 2 in which the ball object OBJ is placed in the virtual game space (step 108), and the process proceeds to the next step.

Then, the CPU 10 determines whether the movement of the ball object OBJ in the virtual game space has been completed (step 109). For example, the movement of the ball object OBJ is completed when the ball object OBJ is caught by the catcher, when the ball object OBJ is hit by the batter, etc. If the movement of the ball object OBJ is completed, the CPU 10 exits the process of the subroutine. If the movement of the ball object OBJ is not completed, the process proceeds to step 110.

In step 110, the CPU 10 updates the movement vector data Dn by modifying the movement vector according to the ball spin amount, and the process returns to step 107 to repeat the process. For example, the CPU 10 adds a change vector according to the ball spin amount in a direction perpendicular to the previously calculated movement vector to thereby obtain a new movement vector.

Figure 21:
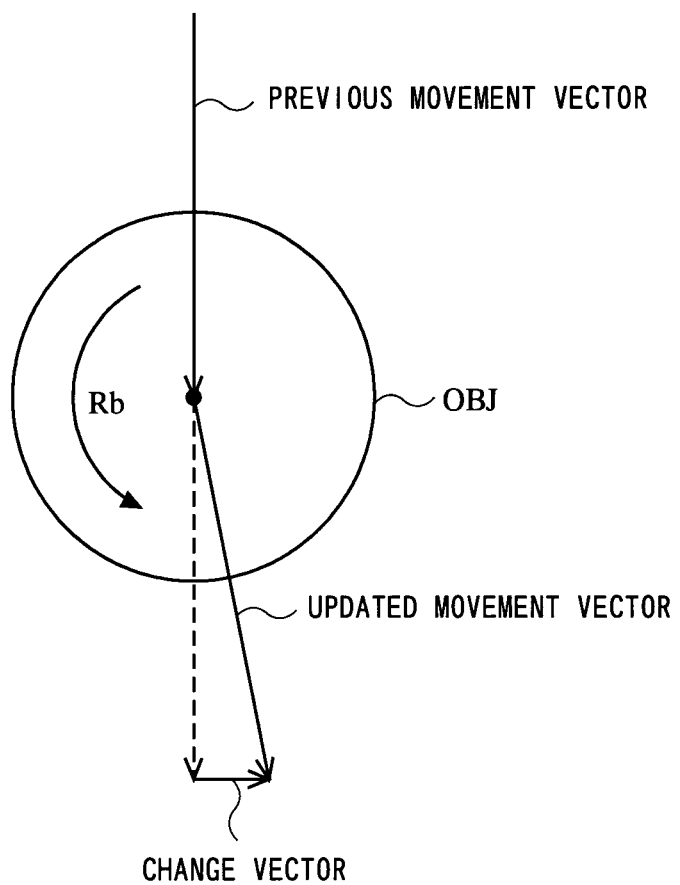
FIG. 21 shows an example of how a movement vector of the ball object OBJ is updated.

As shown in FIG. 21, where the ball object OBJ has a left-handed spin of the ball spin amount Rb, the process sets a change vector that is oriented to the left of, and perpendicular to, the traveling direction of the ball object OBJ (i.e., the direction of the previously calculated movement vector). Then, the change vector is added to the previous movement vector to obtain a new movement vector. The magnitude of the change vector may be in proportion to the magnitude of the movement vector. Then, it is possible to impart the same trajectory change upon the ball object OBJ, irrespective of the speed of the ball object OBJ, i.e., to move the ball object OBJ from the pitcher character P to the catcher along substantially the same trajectory, irrespective of the ball speed. In other embodiments, the magnitude of the change vector may be a magnitude in proportion to the ball spin speed or a predetermined fixed value.

Thus, with the game device 3 of the present embodiment, it is possible by the controller 7 including the acceleration sensor 701 to determine the direction in which the controller 7 is twisted while being swung by using the acceleration in the predetermined axial direction (Y-axis direction) detected during a predetermined period of time. Then, the game process is performed by using the determined twist direction, thus realizing a control input that is more intuitive and simpler for the player.

The present embodiment can also be realized by using an acceleration sensor capable of detecting the acceleration in two axial directions. For example, where the controller 7 is provided with an acceleration sensor capable of detecting the acceleration in the X-axis and Y-axis directions (see FIGS. 3 and 4), the calculation of the magnitude s of the acceleration vector in step 55 can be done with only the X and Y components. Where the controller 7 is provided with an acceleration sensor capable of detecting the acceleration in the Y-axis and Z-axis directions, the calculation of the magnitude s of the acceleration vector in step 55 and the calculation of the difference vector in step 101 can be done with only the Y and Z components or with only the Z component.

While the swing type is determined based on the direction of the acceleration occurring during a decelerating period of the player's downward swing of the controller 7 in the above description, the swing type may alternatively be determined based on the acceleration occurring in any other suitable period. For example, the swing type can be determined based on the direction of the acceleration occurring during an accelerating period of the player's downward swing of the controller 7, by reversing the signs of the type determination thresholds and by adjusting the determination values.

In the above description, the present invention is applied to controlling a breaking ball thrown by a pitcher of a baseball game as an example. Alternatively, the present embodiment can be used in any other suitable games. For example, it is understood that the present embodiment can also be applied to games where the player character strikes an object (e.g., tennis, volleyball, and table tennis), or games where the player character throws an object (e.g., a bowling).

In the above description, the game system 1 includes the game device main unit 5 that is controlled by swinging the controller 7. Alternatively, the present embodiment can also be applied to an information processing device such as a general personal computer that is operated using an input device including an acceleration sensor. Various processes can be performed based on the acceleration occurring in the input device, e.g., controlling the status or position of an object or a window being displayed by the information processing device according to the acceleration data outputted from the acceleration sensor of the input device.

The above description is directed to an embodiment where the controller 7 and the game device main unit 5 are wirelessly connected to each other. Alternatively, the controller 7 and the game device main unit 5 may be electrically connected via a cable. In such a case, a cable extending from the controller 7 may be connected to the connection terminal of the game device main unit 5.

The shape of the controller 7, and the shape, number and arrangement, etc., of the control sections 72 provided on the controller 7, are all illustrative, and it is understood that the present invention can be carried out with any other suitable shape, number and arrangement. It is also understood that the above-mentioned setting values, determination values, etc., are all illustrative, and the present embodiment can be carried out with any other suitable values.

Note that the game program of the present embodiment may be supplied to the game device main unit 5 via a wired or wireless communications line, instead of via an external storage medium such as the optical disc 4. Alternatively, the game program may be pre-stored in a non-volatile storage device inside the game device main unit 5. The information storage medium for storing the game program may be a non-volatile semiconductor memory, as well as a CD-ROM, a DVD or any other suitable type of an optical disc medium.

With the game device and the storage medium storing a game program of the present embodiment, it is possible to realize a more intuitive and simpler control input, and the present embodiment is thus useful as a device and a program for performing a game process, etc., according to a motion imparted upon an input device such as a game controller.

While the embodiment presented herein has been described in detail, the foregoing description is in all aspects illustrative and not restrictive. It is understood that numerous other modifications and variations can be devised without departing from the scope of the embodiment.

What is claimed is:

1. A game device for performing a game process by using acceleration data outputted from a multi-axis acceleration sensor provided in an input device, the game device comprising a processing system, said processing system including one or more computer processors configured to:
   obtain the acceleration data from the input device;
   detect a swing of the input device in a real space when an acceleration represented by the acceleration data satisfies a predetermined condition;
   determine a type of swing of the input device in the real space by using an acceleration in a predetermined axial direction of the multi-axis acceleration sensor among all the accelerations represented by the obtained acceleration data after the swing is detected;
   move a predetermined object in a virtual game space according to the determined type of swing; and
   display the virtual game space with the object therein on a display device, wherein
   one type of swing is selected from among a plurality of types pre-defined based on a twist given to the input device assembly while the input device is being swung in the real space, based on the acceleration in the predetermined axial direction, wherein
   said one type of swing is selected among the plurality of types of swings based on the comparison of an average value of the acceleration along the predetermined axial direction over a predetermined time period during the swing of the input device with a range of values of acceleration values, the range having predetermined end values, and wherein
   said one type of swing comprises a combination of a swing upwards or downwards given to the input device and a twist rightwards or leftwards given to the input device while the input device is being swung upwards or downwards.

2. The game device according to claim 1, wherein the type of swing is determined based on the acceleration in the predetermined axial direction represented by the acceleration data, which is obtained during a predetermined period of time after the swing detection.

3. The game device according to claim 1, wherein one type of swing is selected from among the plurality of types based on a comparison between a predetermined threshold value and the acceleration in the predetermined axial direction.

4. The game device according to claim 1, wherein:
   the type determination determines, in advance, a first threshold value to be greater than a reference value and a second threshold value to be smaller than the reference value so that a difference between the first threshold value and the reference value is different from a difference between the second threshold value and the reference value, wherein the reference value is a value of the acceleration in the predetermined axial direction occurring when the input device is swung with no twist being given to the input device assembly; and
   the type determination selects one of the plurality of types based on a comparison between the first and second threshold values and the acceleration in the predetermined axial direction.

5. The game device according to claim 1, wherein the predetermined axial direction is a direction perpendicular to a direction of an axis about which the input device assembly is twisted.

6. The game device according to claim 1, wherein:
   the object moving includes change-of-direction type selecting for selecting one of a plurality of change-of-direction types based on the determined type, each change-of-direction type representing a direction in which a movement direction of the object changes in the virtual game space; and
   the object moving moves the object in the virtual game space according to the selected change-of-direction type.

7. The game device according to claim 1, further comprising:
   acceleration history storage locations for storing a history of obtained acceleration data obtained over a predetermined period of time; and the one or more computer processors is configured to:
   determine a moving speed of the object in the virtual game space based on changes in an acceleration in the predetermined axial direction and that in an axial direction other than the predetermined axial direction among all the accelerations represented by the history of acceleration data stored in the acceleration history storage locations,
   wherein the object moving moves the object according to the determined moving speed.

8. The game device according to claim 1, wherein:
   the input device includes a control button for outputting predetermined control data when pressed down by a player;
   the obtaining further obtains the control data from the input device; and
   the swing detection detects a swing of the input device when the acceleration represented by the acceleration data satisfies the predetermined condition while the control data indicating that a predetermined control button is pressed down is being obtained.

9. A non-transitory storage medium storing a game program to be executed by a computer of a game device for performing a game process by using acceleration data outputted from a multi-axis acceleration sensor provided in an input device, the game program instructing the computer to perform:
   obtaining the acceleration data from the input device;
   swing detection for detecting a swing of the input device in a real space when an acceleration represented by the acceleration data satisfies a predetermined condition;
   type determination for determining a type of swing of the input device in the real space by using an acceleration in a predetermined axial direction of the multi-axis acceleration sensor among all the accelerations represented by the obtained acceleration data after the swing detection;
   object moving for moving a predetermined object in a virtual game space according to the type determined by the type determination; and display control for displaying the virtual game space with the object therein on a display device, wherein the type determination selects one type of swing from among a plurality of types pre-defined based on a twist given to the input device assembly while the input device is being swung in the real space, based on the acceleration in the predetermined axial direction, wherein said one type of swing is selected among the plurality of types of swings based on the comparison of an average value of the acceleration along the predetermined axial direction over a predetermined time period during the swing of the input device with a range of values of acceleration values, the range having predetermined end values, and wherein said one type of swing comprises a combination of a swing upwards or downwards given to the input device and a twist rightwards or leftwards given to the input device while the input device is being swung upwards or downwards.

10. The non-transitory storage medium storing a game program according to claim 9, wherein the type determination determines the type based on the acceleration in the predetermined axial direction represented by the acceleration data, which is obtained during a predetermined period of time after the detection by the swing detection.

11. The non-transitory storage medium storing a game program according to claim 9, wherein the type determination selects one type from among the plurality of types based on a comparison between a predetermined threshold value and the acceleration in the predetermined axial direction.

12. The non-transitory storage medium storing a game program according to claim 9, wherein:

the type determination determines, in advance, a first threshold value to be greater than a reference value and a second threshold value to be smaller than the reference value so that a difference between the first threshold value and the reference value is different from a difference between the second threshold value and the reference value, wherein the reference value is a value of the acceleration in the predetermined axial direction occurring when the input device is swung with no twist being given to the input device assembly; and the type determination selects one of the plurality of types based on a comparison between the first and second threshold values and the acceleration in the predetermined axial direction.

13. The non-transitory storage medium storing a game program according to claim 9, wherein the predetermined axial direction is a direction perpendicular to a direction of an axis about which the input device assembly is twisted.

14. The non-transitory storage medium storing a game program according to claim 9, wherein:

the object moving includes change-of-direction type selecting for selecting one of a plurality of change-of-direction types based on the type determined by the type determination, each change-of-direction type representing a direction in which a movement direction of the object changes in the virtual game space; and the object moving moves the object in the virtual game space according to the change-of-direction type selected by the change-of-direction type selecting.

15. The non-transitory storage medium storing a game program according to claim 9, wherein the game program instructs the computer to further perform:

storing in a memory a history of acceleration data obtained over a predetermined period of time; and determining a moving speed of the object in the virtual game space based on changes in an acceleration in the predetermined axial direction and that in an axial direction other than the predetermined axial direction among all the accelerations represented by the history of acceleration data stored in the memory, wherein the object moving moves the object according to the determined moving speed.

16. The non-transitory storage medium storing a game program according to claim 9, wherein:

the input device includes a control button for outputting predetermined control data when pressed down by a player;

the obtaining further obtains the control data from the input device; and the swing detection detects a swing of the input device when the acceleration represented by the acceleration data satisfies the predetermined condition while the control data indicating that a predetermined control button is pressed down is being obtained.

17. A method for performing a game process by using acceleration data outputted from a multi-axis acceleration sensor provided in an input device, the method comprising:

obtaining the acceleration data from the input device;

detecting a swing of the input device in a real space when an acceleration represented by the acceleration data satisfies a predetermined condition;

determining a type of swing of the input device in the real space by using an acceleration in a predetermined axial direction of the multi-axis acceleration sensor among all the accelerations represented by the obtained acceleration data after the swing detection;

moving a predetermined object in a virtual game space according to the determined type; and displaying the virtual game space with the object therein on a display device, wherein the determining a type of swing selects one type of swing from among a plurality of types pre-defined based on a twist given to the input device assembly while the input device is being swung in the real space, based on the acceleration in the predetermined axial direction, wherein said one type of swing is selected among the plurality of types of swings based on the comparison of an average value of the acceleration along the predetermined axial direction over a predetermined time period during the swing of the input device with a range of values of acceleration values, the range having predetermined end values, and wherein said one type of swing comprises a combination of a swing upwards or downwards given to the input device and a twist rightwards or leftwards given to the input device while the input device is being swung upwards or downwards.

* * * * *